US010345997B2

(12) United States Patent
Gupta

(10) Patent No.: US 10,345,997 B2
(45) Date of Patent: Jul. 9, 2019

(54) GESTURE-CONTROLLED PILING OF DISPLAYED DATA

(71) Applicant: Microsoft Technology Licensing, LLC, Redmond, WA (US)

(72) Inventor: Rahul Gupta, Hyderabad (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 342 days.

(21) Appl. No.: 15/159,302

(22) Filed: May 19, 2016

(65) Prior Publication Data

US 2017/0336923 A1 Nov. 23, 2017

(51) Int. Cl.
*G06F 3/0482* (2013.01)
*G06F 3/0488* (2013.01)
*G06F 3/044* (2006.01)
*G06F 3/0484* (2013.01)

(52) U.S. Cl.
CPC ............ *G06F 3/0482* (2013.01); *G06F 3/044* (2013.01); *G06F 3/0488* (2013.01); *G06F 3/04842* (2013.01); *G06F 3/04883* (2013.01); *G06F 2203/04104* (2013.01); *G06F 2203/04808* (2013.01)

(58) Field of Classification Search
CPC .................................................... G06F 3/0482
USPC ......................................................... 715/810
See application file for complete search history.

(56) References Cited

U.S. PATENT DOCUMENTS

| 8,954,895 | B1* | 2/2015 | Yaksick | G06F 3/04883 |
| | | | | 715/863 |
| 9,086,785 | B2* | 7/2015 | Chaudhri | G06F 3/0483 |
| 9,607,289 | B2* | 3/2017 | Matas | G06Q 10/10 |
| 2010/0090971 | A1 | 4/2010 | Choi et al. | |

(Continued)

OTHER PUBLICATIONS

Van EE, Anne Marijn, "Touch-Based Organization of Patent Collections", In Thesis for the degree of Master in Science, Aug. 28, 2012, 141 pages.

(Continued)

*Primary Examiner* — William D Titcomb
(74) *Attorney, Agent, or Firm* — Jeffrey L. Ranck; Ranck IP Law

(57) ABSTRACT

Techniques and technologies for gesture-controlled piling of displayed data items are described. In at least some embodiments, a system for gesture-controlled piling of displayed data includes a display operable to detect at least one of a gesture proximate at least a gesture-sensitive portion of the display or a touch of a touch-sensitive portion of the display, the display configured to display a plurality of data items; a processing component operatively coupled to the display, the processing component configured to: control the display to display a plurality of data items; detect using at least one of the gesture-sensitive portion or the touch-sensitive portion a selection of a first data item of the plurality of displayed data items; detect using at least one of the gesture-sensitive portion or the touch-sensitive portion a selection of one or more second data items of the plurality of displayed data items; and control the display to alter the display of the plurality of data items such that the one or more second data items visually appear to be moved into a pile with the first data item.

20 Claims, 14 Drawing Sheets

(56) References Cited

U.S. PATENT DOCUMENTS

| | | | |
|---|---|---|---|
| 2010/0162176 A1* | 6/2010 | Dunton | G06F 3/0483 715/862 |
| 2012/0030566 A1 | 2/2012 | Victor | |
| 2012/0036466 A1* | 2/2012 | Venon | G06F 3/0482 715/772 |
| 2012/0060088 A1* | 3/2012 | Hill | G06F 3/0481 715/702 |
| 2013/0069860 A1* | 3/2013 | Davidson | G06F 3/0416 345/156 |
| 2013/0154978 A1 | 6/2013 | Kim et al. | |
| 2013/0227490 A1 | 8/2013 | Thorsander et al. | |
| 2013/0328804 A1 | 12/2013 | Oshima et al. | |
| 2014/0096092 A1* | 4/2014 | Johnson | G06F 3/0481 715/863 |
| 2014/0143725 A1* | 5/2014 | Lee | G06F 17/30017 715/834 |
| 2014/0173483 A1 | 6/2014 | Hicks | |
| 2014/0215336 A1 | 7/2014 | Gardenfors et al. | |
| 2014/0215393 A1* | 7/2014 | Schwartz | G06F 3/0482 715/810 |
| 2014/0248948 A1 | 9/2014 | Ho et al. | |
| 2014/0344765 A1 | 11/2014 | Hicks et al. | |
| 2014/0375653 A1* | 12/2014 | Branton | G06T 11/20 345/441 |
| 2015/0185975 A1* | 7/2015 | Hasegawa | G06F 3/0482 715/765 |
| 2016/0062573 A1* | 3/2016 | Dascola | G06F 3/0482 715/810 |

OTHER PUBLICATIONS

Kulik, et al., "The Hold-And-Move Gesture for Multi-Touch Interfaces", Retrieved on: Dec. 28, 2015 Available at: https://www.uni-weimar.de/projekte/vr-scratch/publications/hold-and-move/.

"International Search Report and Written Opinion Issued in PCT Application No. PCT/US2017/032307", dated Aug. 11, 2017, 10 Pages.

* cited by examiner

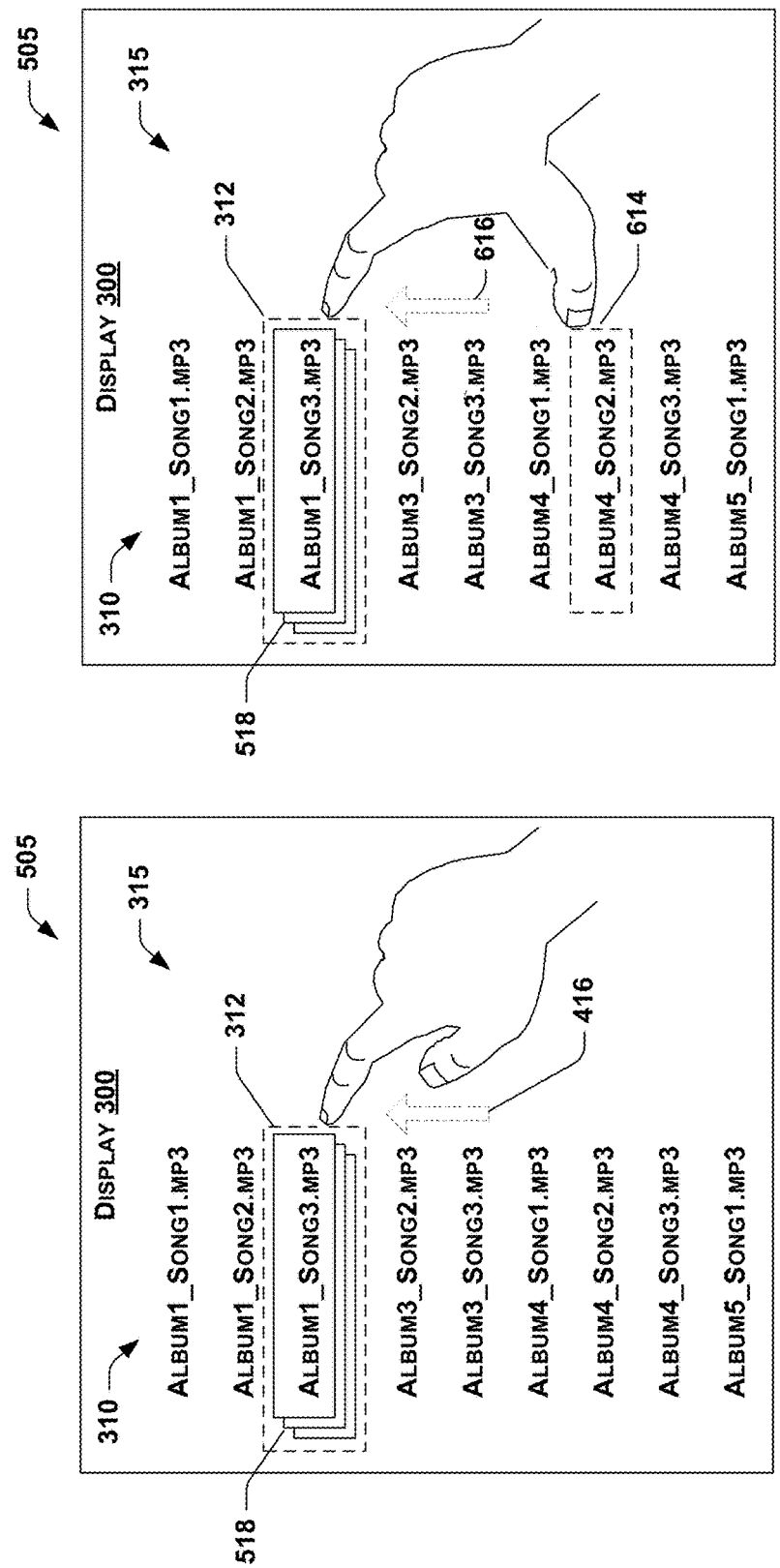

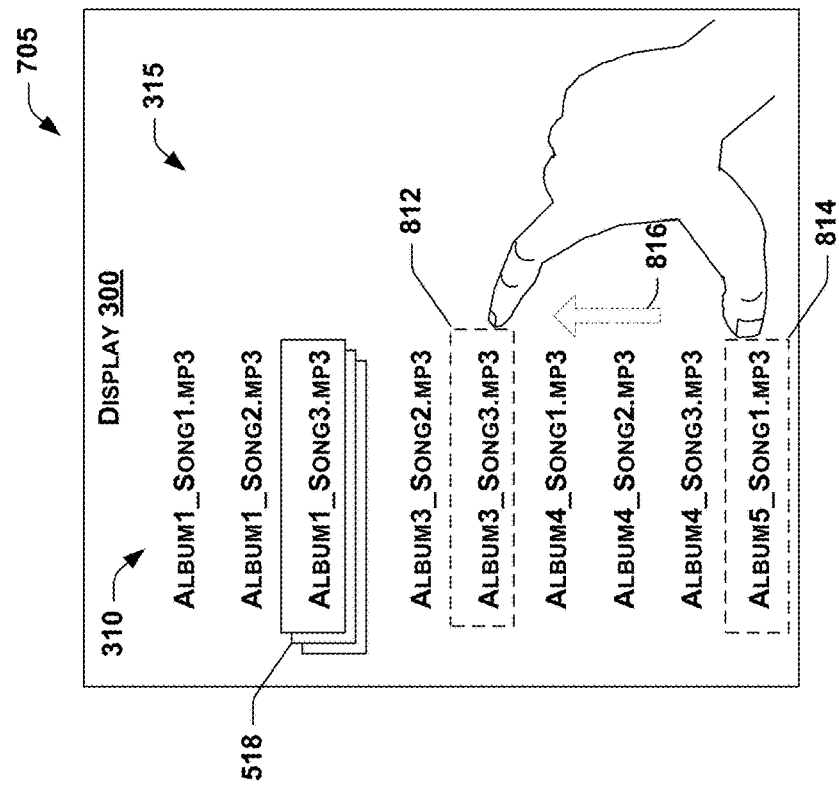
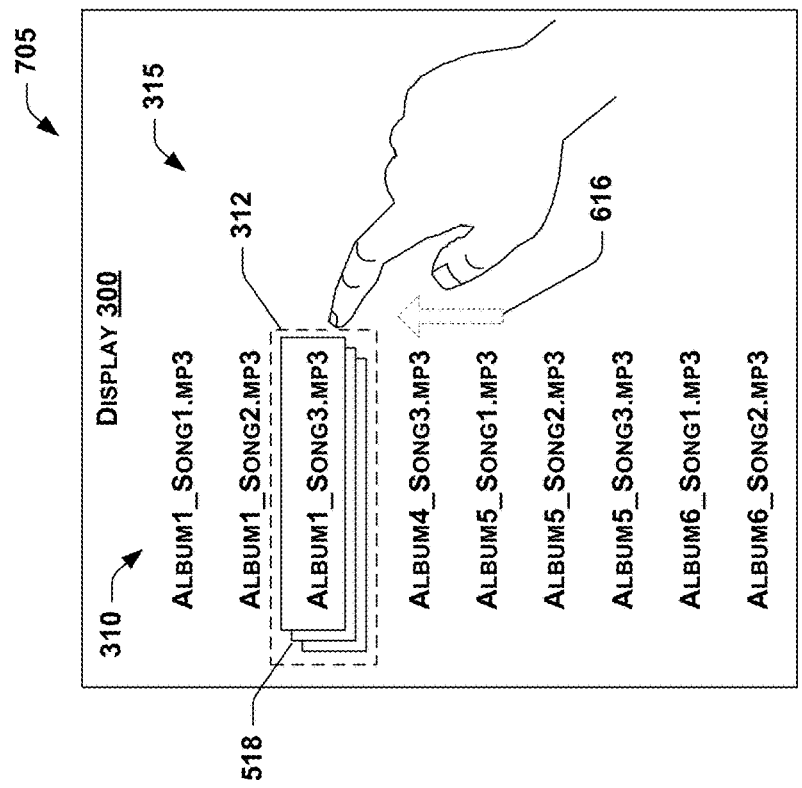

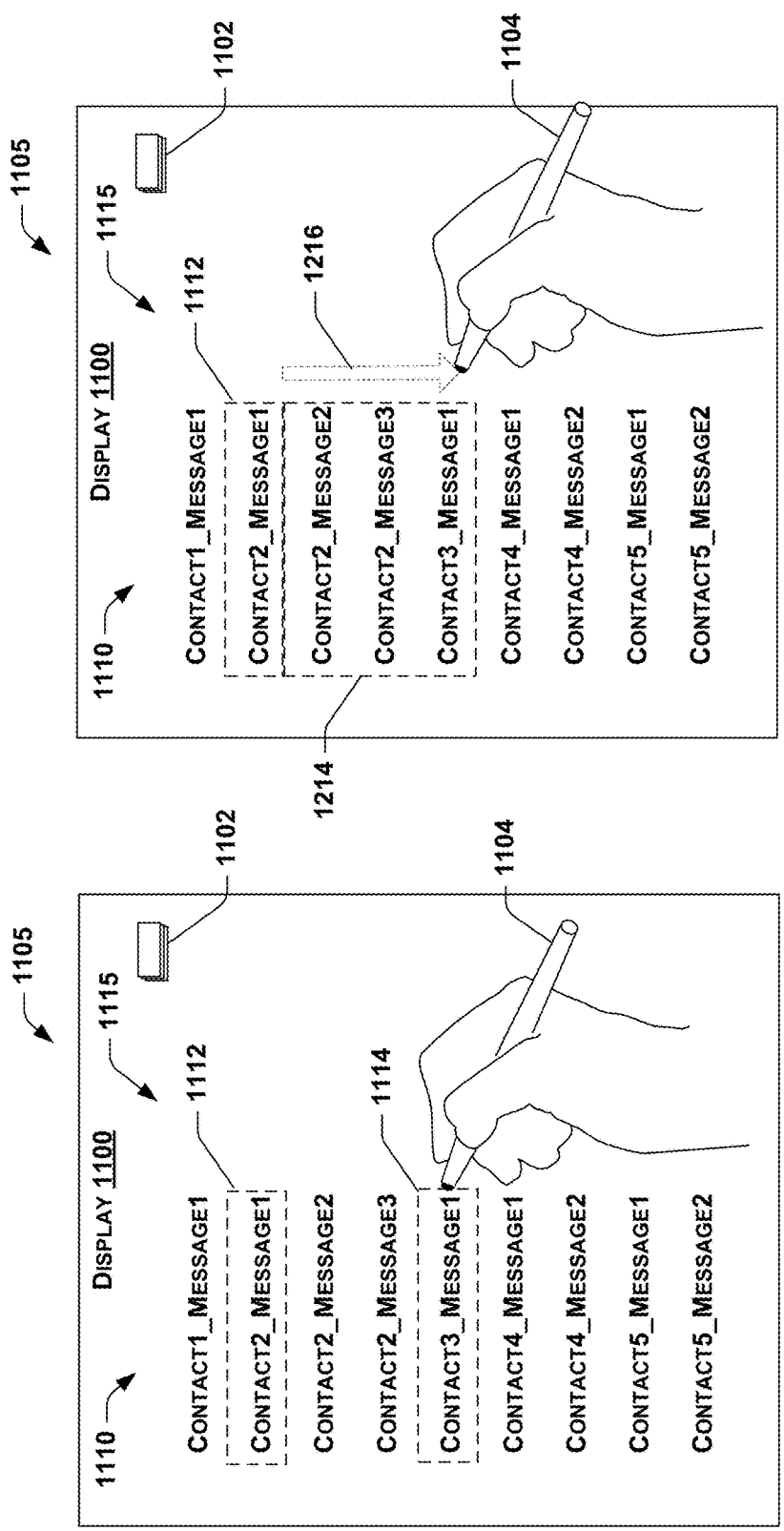

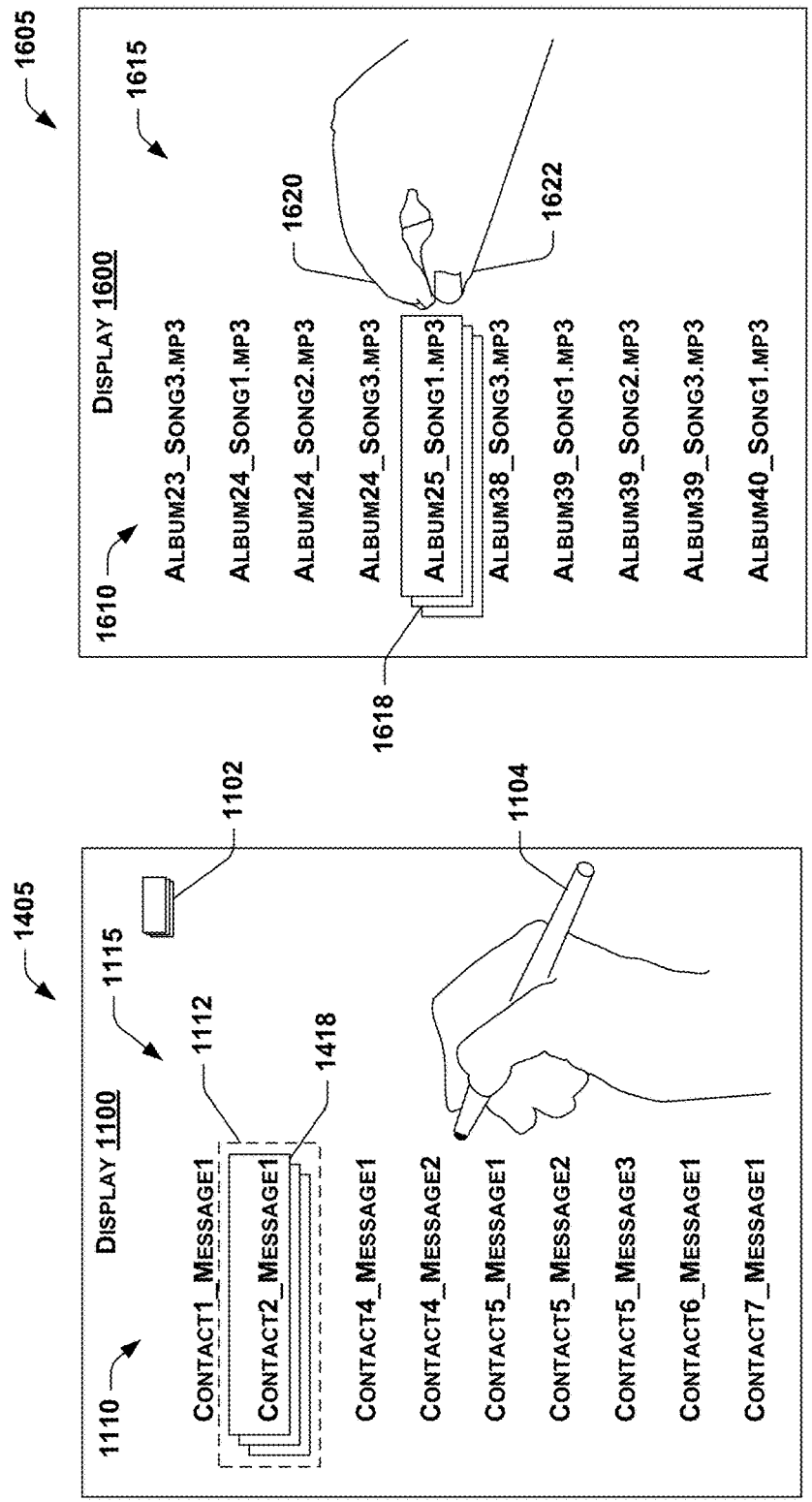

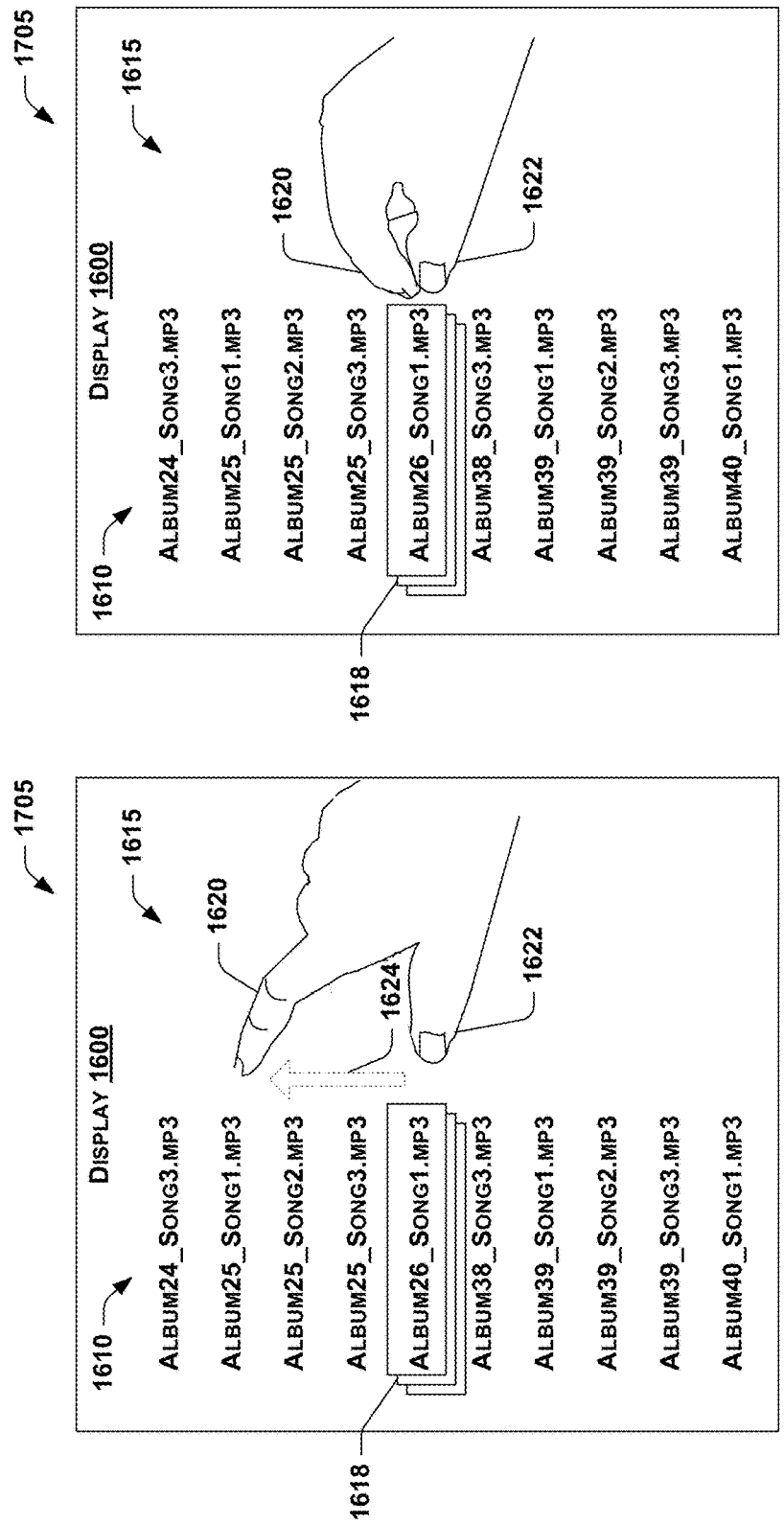

GESTURE-CONTROLLED PILING OF DISPLAYED DATA

BACKGROUND

Devices and applications which allow a user to view information may encounter difficulties associated with displaying such information as the number of data items grows larger. For example, when a user works with a large set of data items displayed as a list, the list of data items may extend beyond the viewable display area. In such cases, the user may be required to scroll down many times to reach a portion of the displayed list that is of interest to the user. The problem may become particularly acute when the device has a relatively small display, such as a cellular telephone, a tablet or slate computer, a smart watch, an in-dash display, or other types of mobile devices.

SUMMARY

In at least some embodiments, a system for gesture-controlled piling of displayed data includes a memory configured to store a plurality of data items; a display including a touch sensitive portion configured to display the plurality of data items; a processing component operatively coupled to the memory and to the display, the processing component configured to: control the display to display the plurality of data items; receive at least one first selection signal from the touch-sensitive portion of the display indicating a selection of a first data item of the plurality of displayed data items; receive at least one second selection signal from the touch-sensitive portion of the display indicating a selection of one or more second data items of the plurality of displayed data items; and control the display to alter the display of the plurality of data items such that the one or more second data items are no longer displayed and to alter the display of the first data item to visually indicate that the one or more second data items are piled into a pile with the first data item.

Similarly, in at least some implementations, a system for gesture-controlled piling of displayed data, comprises a display operable to detect at least one of a gesture proximate at least a gesture-sensitive portion of the display or a touch of a touch-sensitive portion of the display, the display configured to display a plurality of data items; a processing component operatively coupled to the display, the processing component configured to: control the display to display a plurality of data items; detect using at least one of the gesture-sensitive portion or the touch-sensitive portion a selection of a first data item of the plurality of displayed data items; detect using at least one of the gesture-sensitive portion or the touch-sensitive portion a selection of one or more second data items of the plurality of displayed data items; and control the display to alter the display of the plurality of data items such that the one or more second data items visually appear to be moved into a pile with the first data item.

Additionally, in at least some implementations, a method for gesture-controlled piling of displayed data comprises: displaying a plurality of data items using a display; detecting at least one of a first gesture or a first contact indicative of a selection of a first data item of the plurality of displayed data items; detecting at least one of a second gesture or a second contact indicative of a selection of one or more second data items of the plurality of displayed data items; and altering the display of the plurality of data items on the display such that the one or more second data items visually appear to be moved into a pile with the first data item.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the use of the same reference numbers in different figures indicates similar or identical components.

FIGS. 3 through 9 show an embodiment of a display displaying a list of data items in various display states.

FIGS. 11 through 14 show another embodiment of a display displaying a list of data items in various display states.

FIGS. 16 through 19 show another embodiment of a display displaying a list of data items in various display states.

DETAILED DESCRIPTION

The present disclosure describes techniques and technologies for gesture-controlled piling of displayed data. As described more fully below, techniques and technologies for downloading visual assets in accordance with the present disclosure may advantageously enable a user to modify displayed data by efficiently piling (or stacking) data items to improve subsequent retrieval, viewing, and selection of desired data.

For example, in at least some implementations, techniques and technologies for downloading visual assets as disclosed herein may enable a user to control a display of data using movements or gestures with one or more fingers (or a stylus) to cause piling of at least some of the displayed data items into one or more piles. The piles represent ordered sets of data items that are piled (or stacked) to make the display of data more manageable and require less area on a display screen. By piling at least some of the data items in a lengthy list into one or more piles (or stacks), on subsequent attempts to view the data, the user may advantageously reach the desired portion(s) of the list much more quickly and efficiently, with fewer input signals, less processing requirements, and less power consumption, in comparison with conventional techniques and technologies.

Figure 1:
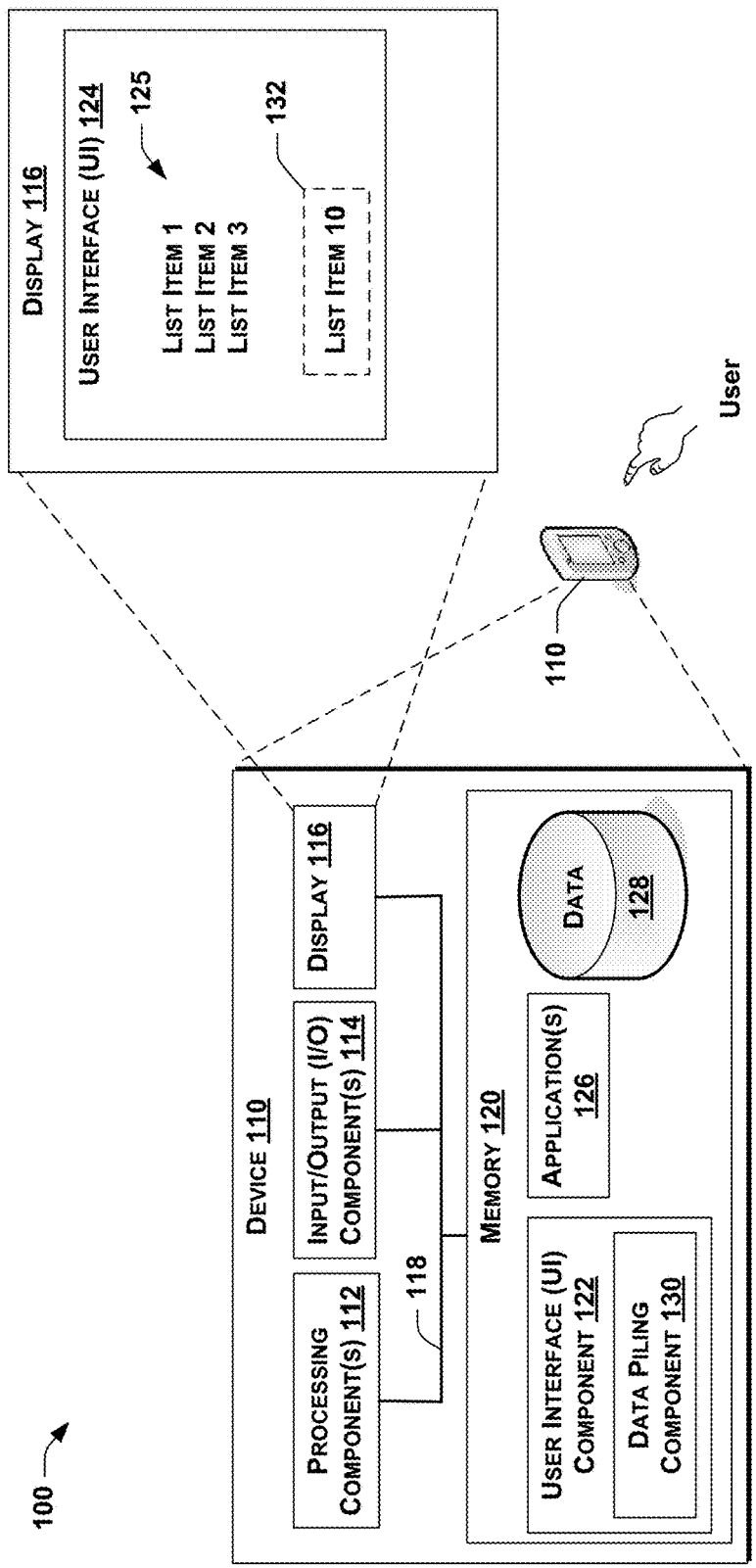
FIG. 1 shows an embodiment of an environment for gesture-controlled piling of displayed data.

FIG. 1 shows an embodiment of an environment 100 for gesture-controlled piling of displayed data in accordance with the present disclosure. In this embodiment, the environment 100 includes a device 110 that includes one or more processing components 112, one or more input/output (I/O) components 114, and a display 116 operatively coupled to a memory 120 by a bus 118.

In the embodiment shown in FIG. 1, a user interface (UI) component 122 is stored on the memory 120. In at least some implementations, the user interface component 122 includes executable instructions that, when executed by the one or more processing components 112, cause a user interface 124 to be displayed on the display 116 of the device 110. In at least some implementations, the display 116 may be a touch-sensitive display that detects and accepts one or more inputs via one or more gestures. The one or more gestures may include contact with a surface of the display (e.g. using a finger, a stylus, or other suitable object to contact, touch, tap, press, slide, swipe, etc.), or may include a movement near the surface of the display (e.g. near-surface movement, hovering, etc.), or any suitable combination thereof.

As further shown in FIG. 1, in this embodiment, one or more applications 126 and data 128 are stored on the memory 120. The one or more applications 126 may be invoked by a user of the device 110 to perform a variety of operations, including to display at least part of the data 128 on the display 116 via the user interface 124. For example, in at least some implementations, the data 128 may be displayed as a list 125 of list items (e.g. List Item 1, List Item 2, List Item 3, etc.).

In at least some implementations, the user interface (UI) component 122 includes a data piling component 130. The data piling component 130 may include executable instructions that are configured to enable the user to perform one or more operations associated with gesture-controlled piling of displayed data in accordance with the present disclosure. More specifically, in at least some implementations, the user may perform one or more gestures (e.g. using one or more fingers, a stylus, etc.) to cause list items of the list 125 to be visually piled (or stacked) into a pile 132, as described more fully below. For example, in the embodiment shown in FIG. 1, the display 116 shows the pile 132 having "List Item 10" visible at the top of the pile, and the list 125 includes "List Item 3" visible immediately before the pile 132, thereby indicating that, in this representative example, the pile 132 includes List Items 4 through 10, with List Item 10 being at the top of the pile 132.

It will be appreciated that the device 110 shown in FIG. 1 may represent a variety of possible device types, including but not limited to a handheld device, such as a cellular telephone, a Personal Data Assistant (PDA), a notebook computer, a tablet computer, a slate computer, a laptop computer, a smart watch, or any other handheld device. It should be understood, however, that the device 110 is not limited to a handheld device, and may represent a server, a mainframe, a workstation, a distributed computing device (e.g. a control component of a distributed computing device), a portion of a larger device or system, or any other suitable type of device. In still other embodiments, the device 110 may be a television, a wearable device, a vehicle (or portion of a vehicle), an appliance (or portion of an appliance), a consumer product, or virtually any other suitable device.

Figure 2:
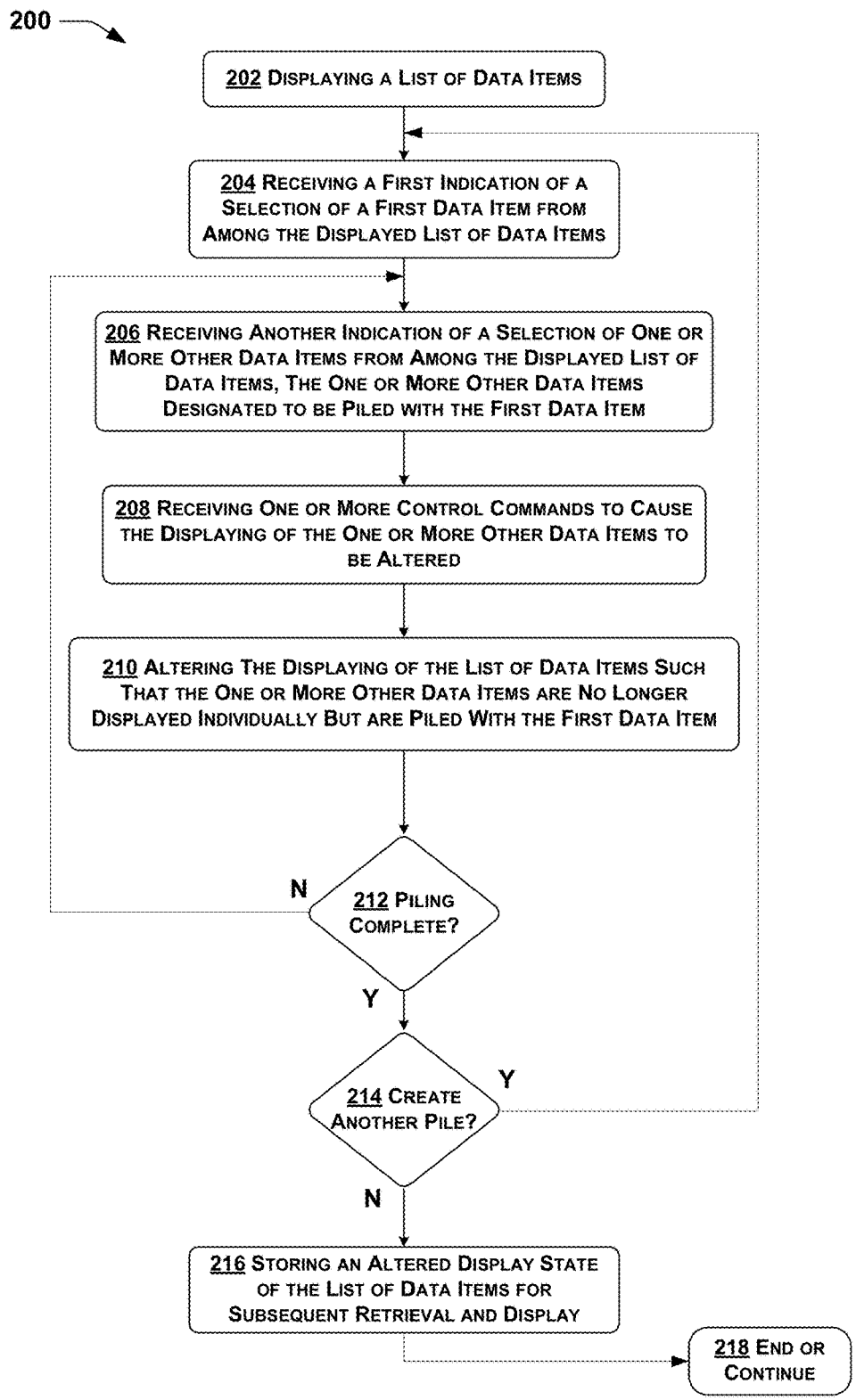
FIG. 2 shows an embodiment of a process for gesture-controlled piling of displayed data items.

FIG. 2 shows an embodiment of a process 200 for gesture-controlled piling of displayed data items in accordance with the present disclosure. In general, the process 200 may be performed by a device (e.g. device 110) operated by a user for performing gesture-controlled piling of displayed data items. In the embodiment shown in FIG. 2, the process 200 includes displaying a list of data items at 202.

Figure 3:
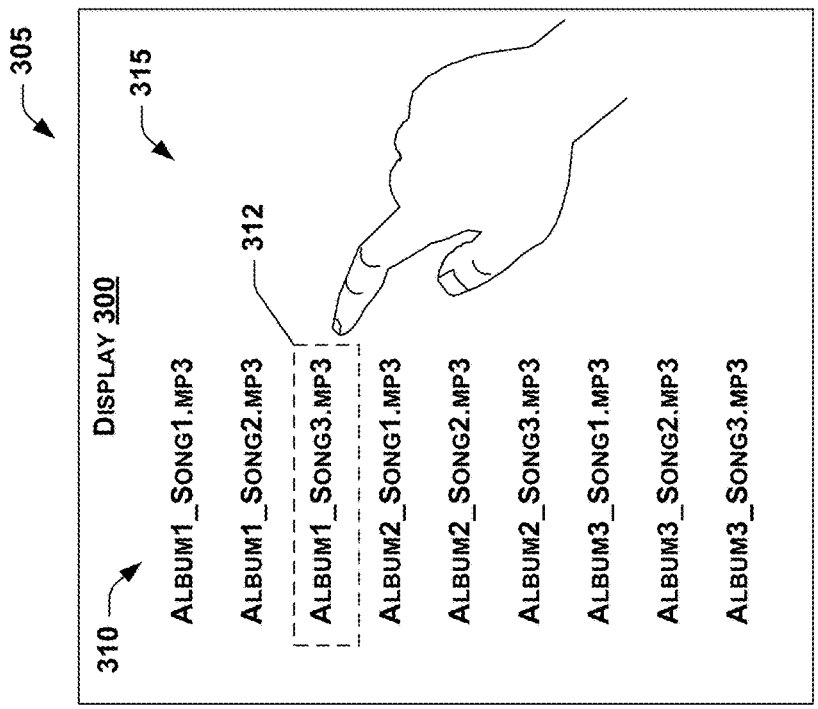

For example, in one illustrative embodiment, FIG. 3 shows a display 300 that displays a list of songs 310 in a first display state 305. More specifically, the list of songs 310 in the first display state 305 includes three songs from a first album (i.e., Album1_Song1.mp3, Album1_Song2.mp3, Album1_Song3.mp3), three songs from a second album (i.e., Album2_Song1.mp3, Album2_Song2.mp3, Album2_Song3.mp3), and three songs from a third album (i.e., Album3_Song1.mp3, Album3_Song2.mp3, Album3_Song3.mp3).

As further shown in FIG. 2, the process 200 further includes receiving a first indication of a selection of a first data item from among the displayed list of data items at 204. In at least some implementations, the first indication of the selection of the first data item (received at 204) may include detecting a contact of a touch-sensitive portion 315 of the display 300 proximate to the first data item, such as by a user contacting the touch-sensitive portion 315 the display 300 using a finger, a stylus, or other contacting object. In some implementations, the first indication may require a continuous contact with the touch-sensitive portion 315 of the display 300 for a specified period of time (e.g. 2 seconds), or at a specified location (e.g. over or within a specified distance of the first data item), or with a specified gesture (e.g. a predetermined number of taps, sweeps, etc.), or in any other suitable manner.

More specifically, in at least some implementations, the user may provide the first indication of the selection of the first data item 312 (received at 204) by touching the touch-sensitive portion 315 of the display 300 proximate to the first data item 312 with a first finger (e.g., a forefinger) in a continuous manner. For example, as shown in FIG. 3, the third song of the first album (i.e. Album1_Song3.mp3) may be selected by a user as the first data item 312 by touching the touch-sensitive portion of the display 300 proximate the first data item 312 in a continuous manner. Alternately, in other implementations, the user may touch the touch-sensitive portion 315 of the display 300 with a stylus or other contacting member. In at least some implementations, following the receiving of the first indication of the selection of the first data item (at 204), the user may maintain the contact of the user's finger (or stylus) on the touch-sensitive portion 315 of the display 300 proximate the first data item 312 during one or more subsequent operations, as described more fully below.

Figure 4:
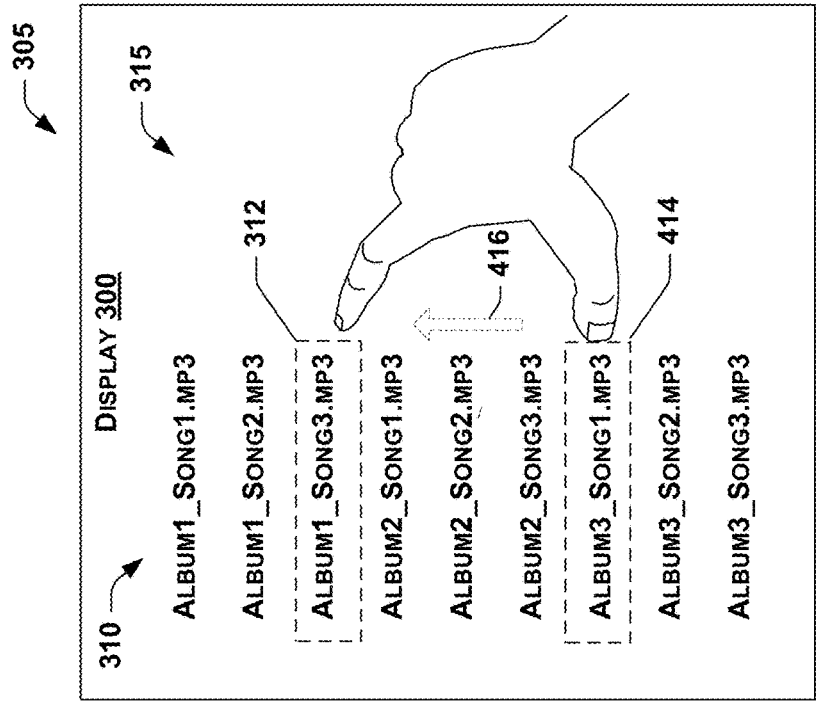

Referring again to FIG. 2, the process 200 for gesture-controlled piling of displayed data items further includes receiving another indication of a selection of one or more other data items from among the displayed list of data items, the one or more other data items designated to be piled with the first data item at 206. In at least some implementations, the receiving another indication of a selection of one or more other data items (at 206) may include detecting another contact of the touch-sensitive portion 315 of the display 300 proximate to a second data item, such as by a user contacting the display 300 using another finger (e.g. thumb), a stylus, or other contacting object. For example, as shown in FIG. 4, with the forefinger still in contact with the touch-sensitive portion 315 of the display 300 proximate the first data item 312, the user may select a second data item 414 (e.g. the first song of the third album, shown as Album3_Song1.mp3) by touching the touch-sensitive portion 315 of the display 300 using their thumb in a continuous manner (or for at least a predetermined period of time). Of course, as noted above, in other implementations, the user may touch the touch-sensitive portion 315 of the display 300 to select the second data item 414 with a different finger, or a stylus, or other contacting member.

In the process 200 for gesture-controlled piling of displayed data items shown in FIG. 2, the detection of the user's selection of the second data item 414 (see FIG. 4) may indicate that the second data item 414 and all intervening data items of the list of data items 310 that are located between the second data item 414 and the first data item 312 are designated to be piled (or stacked) with the first data item 312. In this way, in at least some implementations, the receiving another indication of a selection of one or more other data items from among the displayed list of data items, the one or more other data items designated to be piled with the first data item at 206, may be accomplished by detection of the user's selection of the second data item 414.

Referring again to FIG. 2, in at least some implementations, the process 200 for gesture-controlled piling of displayed data items further includes receiving one or more control commands to cause the displaying of the one or more other data items to be altered at 208. For example, in the particular implementation described above with respect to FIG. 4, after selecting the second data item 414 with the thumb, and with the forefinger still in contact with the touch-sensitive portion of the display 300 proximate the first data item 312, the user may sweep the thumb across the touch-sensitive portion 315 of the display 300 toward the first data item 312 as indicated by arrow 416. The display 300 (or a device that includes the display 300) may detect the sweeping motion of the user's thumb (indicated by arrow 416 of FIG. 4) and may interpret this as the one or more control commands to cause the displaying of the second data item 414 and the intervening data items of the list of data items 310 between the second data item 414 and the first data item 312 to be altered (at 208). In some implementations, the user may sweep the thumb across only a portion of the distance between the second data item 414 and the first data item 312 to provide the one or more control commands (received at 208). In still other implementations, the user may sweep the thumb between the entire distance between the second data item 414 and the first data item 312 (or substantially the entire distance, such as until the thumb is approximately adjacent to the forefinger) to provide the one or more control commands (received at 208).

As further shown in FIG. 2, the process 200 for gesture-controlled piling of displayed data items further includes altering the displaying of the list of data items such that the one or more other data items are no longer displayed individually but are piled (or stacked) with the first data item at 210. In some implementations, the altering of the displaying of the list of data items (at 210) may be performed following the receiving of the one or more control commands (at 208), such as by causing the second data item 414 and the intervening data items between the second data item 414 and the first data item 312 to disappear from the list of data items 310 after the user has swept the thumb toward the forefinger as indicated by the arrow 416 of FIG. 4. In still other implementations, the altering of the displaying of the list of data items (at 210) may be performed approximately simultaneously with the receiving of the one or more control commands (at 208), such as causing each of the intervening data items between the second data item 414 and the first data item 312 to successively disappear into the pile with the first data item 312 as the user sweeps the thumb toward the forefinger (as indicated by the arrow 416 of FIG. 4) until finally, the second data item 414 also disappears into the pile. Thus, in at least some implementations, the altering of the displaying (at 210) may be performed such that the such that the one or more other data items visually appear to be moving into the pile 518 with the first data item 312.

It will be appreciated that although the sweeping operations described above and shown in FIG. 4 are used to pile data items from below the first data item 312 into a pile with the first data item 312, it will be appreciated that in alternate implementations, the process 200 may be used to sweep data items from above the first data item 312 into the pile with the first data item 312. Therefore, throughout this discussion of possible implementations of gesture-controlled piling of data items, it should be appreciated that the teachings of the present disclosure are not necessarily limited to the particular embodiments described and shown in the accompanying figures, and that data items may be moved into a pile with other data items from above or below the selected first data item 312.

FIG. 5 shows an embodiment of the display 300 displaying the list of songs 310 in a second display state 505. In the second display state 505, following the user sweeping the thumb (as indicated by the arrow 416), the intervening data items of the list of data items 310 between the second data item 414 and the first data item 312, as well as the second data item 414, are no longer displayed, and have been piled with the first data item 312 (i.e. Album1_Song3.mp3) selected by the user. In addition, in the second display state 505, the displaying of the first data item 312 has been modified to be surrounded by a pile symbol (e.g. a series of stacked boxes) to indicate that the first data item 312 is now being displayed at the top of a first pile of data items 518. As further shown in FIG. 5, as the second data item 414 and the intervening data items between the second data item 414 and the first data item 312 have been moved upwardly into the pile under the first data item 312, additional data items in the list of data items 310 (e.g. Album4_Song1.mp3, Album4_Song2.mp3, Album4_Song3.mp3, and Album5_Song1.mp3) have become visible and are now displayed in the list of data items 310 shown in the second display state 505.

In at least some implementations, the data items that have been piled with the first data item 312 (i.e. the second data item 414 and all the intervening data items between the second data item 414 and the first data item 312) are piled in an ordered manner with the second data item 414 at the bottom of the pile and the first data item 312 at the top of the pile, and with the intervening data items between the second data item 414 and the first data item 312 maintaining their order in the pile as originally displayed in the list of data items 310 in the first display state 305.

Referring again to FIG. 2, the process 200 for gesture-controlled piling of displayed data items further includes determining whether the piling operations are complete at 212. For example, in at least some implementations, the user may indicate that piling operations are complete by disengaging their forefinger from the touch-sensitive portion 315 of the display 300. The display 300 (or a system that includes the display 300) may detect that contact of the user's forefinger with the display 300 proximate the first data item 312 has ended, and may interpret this as an indication that piling operations are complete (at 212).

As shown in FIG. 2, if it is determined that piling operations are not complete (at 212), the process 200 for gesture-controlled piling of displayed data items may return to operation 206, and may repeat operations 206 through 210. More specifically, the process 200 may return to receiving another indication of a selection of one or more other data items from among the displayed list of data items, the one or more other data items designated to be piled with the first data item (at 206). For example, in at least some implementations, as depicted in FIG. 6, with the user's forefinger continuing to be engaged in contact with the touch-sensitive portion 315 of the display 300 proximate the first data item 312, the user may again extend their thumb and contact the touch-sensitive portion 315 of the display 300 proximate a third data item 614 of the list of data items 310. The detection of the user's selection of the third data item 614 (see FIG. 6) by the display 300 (or the system that includes the display 300) may indicate that the third data item 614 and all intervening data items of the list of data items 310 that are located between the third data item 614 and the first data item 312 are designated to be piled (or stacked) with the first data item 312. Next, the process 200 may again include receiving one or more control commands to cause the displaying of the one or more other data items to be altered (at 208), such as by detecting that the user has moved (or swept) their thumb across the touch-sensitive portion 315 of the display 300 from the third data item 614 toward the first data item 312 (as indicated by arrow 616 of FIG. 6).

Further, the process 200 may again include altering the displaying of the one or more other data items such that the one or more other data items are no longer displayed individually but are piled (or stacked) with the first data item at 210. For example, FIG. 7 shows an embodiment of the display 300 displaying the list of songs 310 in a third display state 705. As shown in this third display state 705, after the user has swept the thumb toward the first data item 312 for the second time (indicated by arrow 616), the third data item 614 (FIG. 6) and the intervening data items between the third data item 614 and the first data item 312 are no longer displayed and have been moved into the pile with the first data item 312. These piling operations (e.g. operations 206 through 210) may be repeated indefinitely until the user has piled a desired number of data items into the pile with the first data item 312, or until the user reaches the end of the list of data items 310.

Referring again to FIG. 2, after determining that piling operations are complete (at 212) (e.g. detecting that the user has disengaged contact of the forefinger proximate the first data item 312), the process 200 for gesture-controlled piling of displayed data items may further include determining whether to create another pile of data items at 214. For example, in at least some implementations, the process 200 may determine that that user wishes to create another pile of data items (at 214) by detecting that the user has again engaged their finger (or stylus or other contacting member) into engagement with the touch-sensitive portion 315 of the display 300 proximate another data item in a continuous manner (or for a predetermined period of time), thereby indicating that the user wishes to create another pile of data items.

Figure 9:
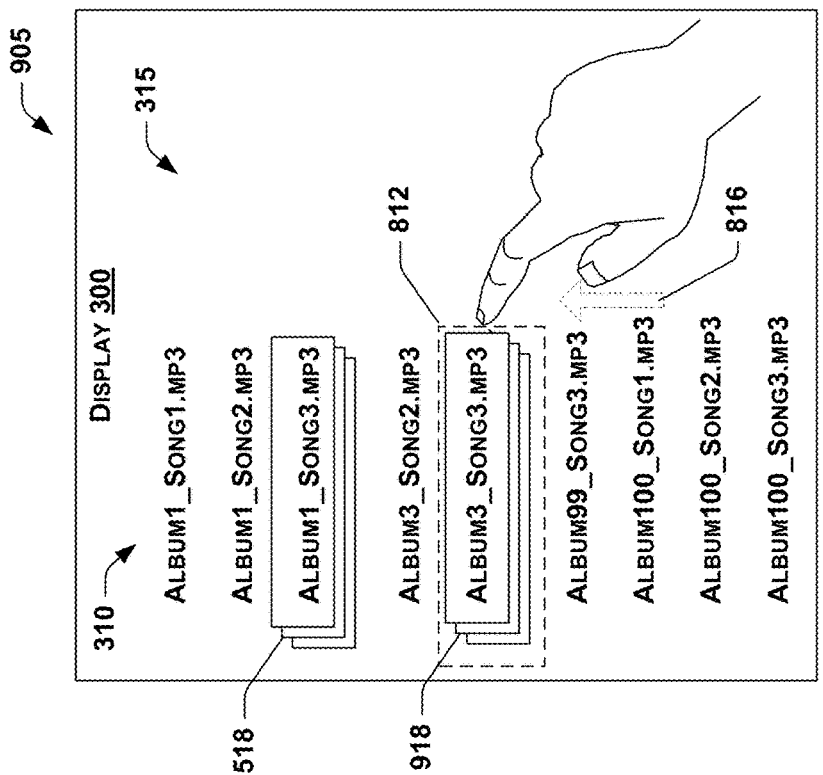

If it is determined that the user wishes to create another pile (at 214), then the process 200 may return to operation 204, and may repeat operations 204 through 212 as described above for creating another pile of data items. For example, with reference FIG. 8, the operations for creating another pile of data items may include: (a) at 204, receiving a first indication of a selection of a first data item from among the displayed list of data items by detecting that the user has placed their forefinger into contact with the touch-sensitive portion 315 of the display 300 proximate a fourth data item 812, (b) at 206, receiving another indication of a selection of one or more other data items from among the displayed list of data items by detecting that the user has engaged their thumb into contact with the touch-sensitive portion 315 of the display 300 proximate a fifth data item 814, (c) at 208, receiving one or more control commands to cause the displaying of the one or more other data items to be altered by detecting that the user has moved their thumb across the touch-sensitive portion 315 of the display 300 toward the fourth data item 812 (as indicated by arrow 816), and (d) at 210, altering the displaying of the list of data items (as shown in FIG. 9) such that the one or more other data items are no longer displayed individually but are piled (or stacked) with the fourth data item 812 by causing the fifth data item 814 and the intervening data items between the fifth data item 814 and the fourth data item 812 to disappear into a second pile of data items 918 beneath the fourth data item 812, and also making more data items of the list of data items 310 be visibly displayed. In addition, the above-noted piling operations (206-210) may be repeated at many times as desired to pile as many data items into the second pile of data items 918 as the user may desire.

For example, FIG. 9 shows the display 300 in a fourth display state 905 with the list of data items 310 now including both the first pile of data items 518 and the second pile of data items 918. In this illustrative embodiment, the user has repeated the above-described piling operations 206-210 enough times so that data items from a lower portion of the list of data items 310 are now visible in the display 300, including Album99_Song3.mp3, Album100_Song1.mp3, Album100_Song2.mp3, and Album100_Song3.mp3. Thus, in the fourth display state 905 shown in FIG. 9, the second pile of data items 918 includes data items Album3_Song3.mp3 through Album99_Song2.mp3.

Referring again to FIG. 2, if it is determined that there is no need to create another pile of data items (at 214), the process 200 for gesture-controlled piling of displayed data items further includes storing an altered display state of the list of data items for subsequent retrieval and display at 216. For example, the storing the altered display state of the list of data items for subsequent retrieval and display (at 216) may include storing a version of the final display state (e.g. fourth display state 905 shown in FIG. 9) or any of the intermediate display states (e.g. third display state 705, second display state 505) so that upon subsequent attempts to access and display the list of data items 310, the user may select and immediately return to a desired display state that includes one or more piles of data items (e.g. first and second pile of data items 518, 918). In other words, upon subsequent accesses and displaying of the list of data items 310, the user does not need to repeat the above-described piling operations (204 through 216), and may elect to immediately return to displaying the fourth display state 905 by accessing the stored altered display state so that the user may have immediate access to data items at the lower portion of the list of data items 310 (e.g. Album100_Song3.mp3). Following the storing of the altered display state of the list of data items (at 216), the process 200 for gesture-controlled piling of data items ends or continues to other operations at 218.

In at least some implementations, the storing of the altered display state of the list of data items for subsequent retrieval and display (at 216) may be performed more frequently or at other locations during the process 200. For example, in at least some implementations, the storing of the altered display state (at 216) may occur after determining that piling operations are complete (at 212), which in still other implementations, the storing of the altered display state (at 216) may occur immediately after the altering of the displaying of the one or more other data items (at 210) and before the determining that piling operations are complete (at 212). The frequency of performing the storing of the altered display state (at 216) may vary from implementation to implementation depending upon operational requirements, system capabilities, user preferences, or other factors.

It will be appreciated that techniques and technologies for gesture-controlled piling of displayed data items as disclosed herein may provide substantial operational improvements in comparison with conventional technologies. For example, techniques and technologies for gesture-controlled piling of displayed data items in accordance with the present disclosure may advantageously enable users to manage displayed information so as to greatly improve the efficiency of accessing such information. In cases of long lists of displayed data items (such as the one described above with respect to FIGS. 2-9), rather than laboriously scrolling through numerous pages of data items to reach a desired portion of the list of data items each time the list of data items is displayed, techniques and technologies in accordance with the present disclosure enable a user to form piles of data items so that, on subsequent accesses, the user may immediately return to a previously-created display state wherein data items that may not be of interest have been formed into one or more piles, allowing the user to quickly and efficiently access the data items of interest without the need to laboriously scroll through numerous pages of data items. Because the user is enabled to reach the desired portions of data more quickly and efficiently, techniques and technologies in accordance with the present disclosure may substantially reduce processing requirements associated with numerous unnecessary displaying and scrolling operations, thereby greatly reducing processing requirements, and also reducing energy consumption, of the displaying system. These advantages may further translate into less wear and tear on processors, display components, circuitry, battery, and other components of displaying systems, thereby prolonging useful life and operability of such systems.

Techniques and technologies for gesture-controlled piling of displayed data items in accordance with the present disclosure are not necessarily limited to the particular embodiments described above with reference to FIGS. 1-9. In the following description, additional embodiments of techniques and technologies for gesture-controlled piling of displayed data items will be described. It should be appreciated that the embodiments described herein are not intended to be exhaustive of all possible embodiments in accordance with the present disclosure, and that additional embodiments may be conceived based on the subject matter disclosed herein. For example, it should be appreciated that at least some of the various components and aspects of the described embodiments may be eliminated to create additional embodiments, or may be variously combined or re-ordered to create still further embodiments. In the following discussion of additional embodiments, common reference numerals may be used to refer to elements introduced above, and for the sake of brevity, descriptions of previously-introduced elements may be omitted so that emphasis can be properly placed on new or varying aspects of such additional embodiments.

Figure 11:
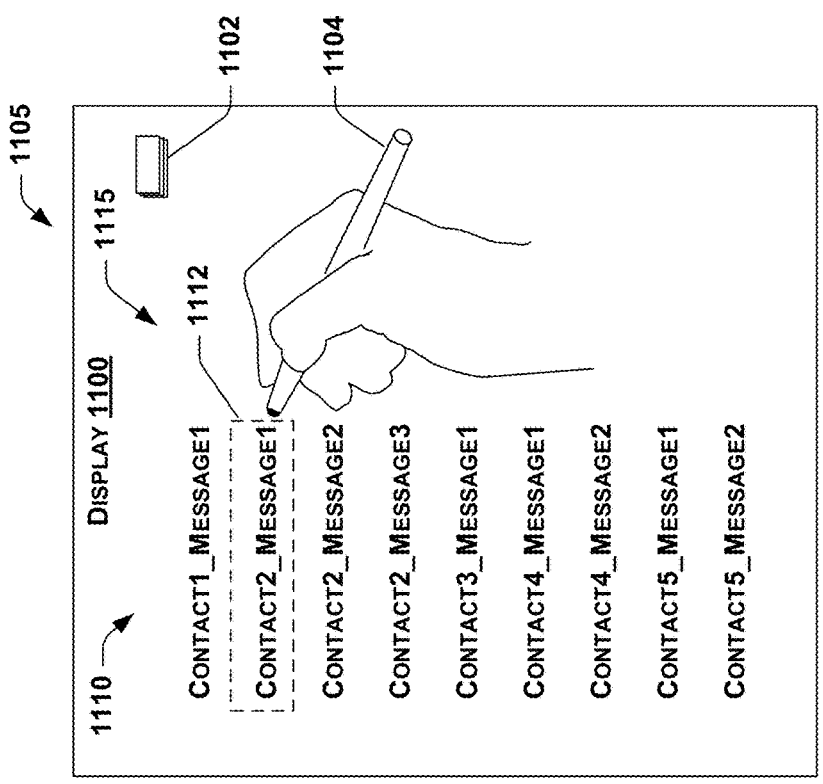
Figure 10:
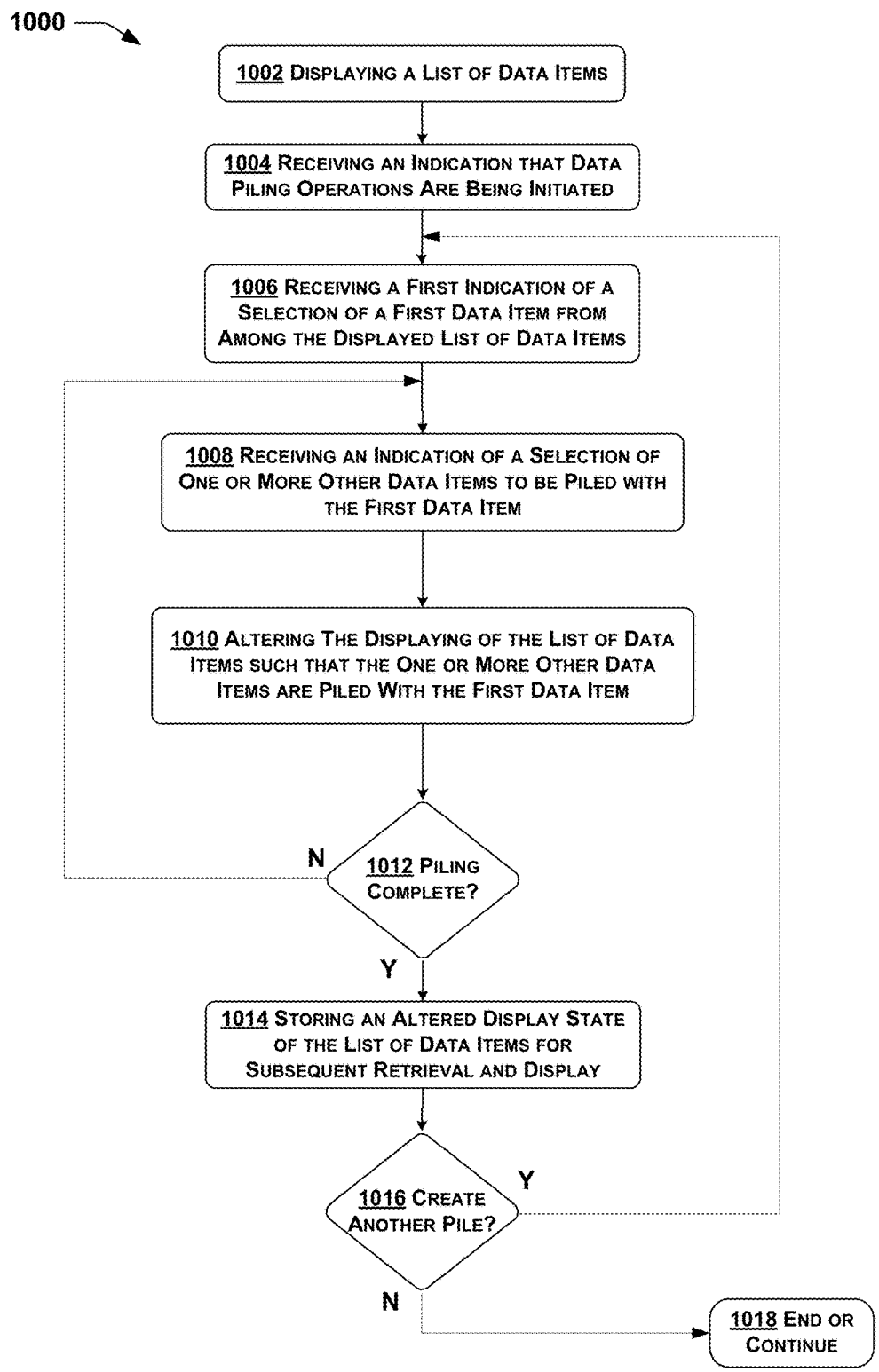
FIG. 10 shows another embodiment of a process for gesture-controlled piling of displayed data items.

For example, FIG. 10 shows another embodiment of a process 1000 for gesture-controlled piling of displayed data items. In at least some implementations, the process 1000 shown in FIG. 10 may be suitable for performing gesture-controlled piling of displayed data items using a single finger, stylus, or contacting member (rather than two fingers as described above). As shown in FIG. 10, the process 1000 includes displaying a list of data items at 1002. For example, in one illustrative embodiment, FIG. 11 shows a display 1100 that displays a list of messages 1110 in a first display state 1105. More specifically, the list of messages 1110 in the first display state 1105 includes one message from a first contact (i.e., Contact1_Message1), three messages from a second contact (i.e., Contact2_Message1, Contact2_Message2, and Contact2_Message3), a message (i.e., Contact3_Message1), two messages from a fourth contact (i.e., Contact4_Message1, and Contact4_Message2), and two messages from a fifth contact (i.e., Contact5_Message1, and Contact5_Message2).

In at least some implementations, the process 1000 further includes receiving an indication that data piling operations are being initiated at 1004. For example, in at least some implementations, a user may select an icon 1102 displayed by the display 1100 (FIG. 11) to indicate that data piling operations are being initiated (at 1004), such as by tapping a touch-sensitive portion 1115 of the display 1100 proximate the icon 1102 with a stylus 1104 (or with a finger or other contacting member). In still other implementations, the user may indicate that data piling operations are being initiated in a variety of ways, such as by one or more gestures on or proximate to the touch-sensitive portion 1115 of the display 1100, or providing a voice command (e.g. "pile," "gaddi", etc.), or any other suitable manner of indication.

As further shown in FIG. 10, in at least some implementations, the process 1000 for gesture-controlled piling of displayed data items further includes receiving a first indication of a selection of a first data item from among the displayed list of data items at 1006. For example, as shown in FIG. 11, the receiving the first indication of the selection of the first data item (at 1006) may include detecting a contact of the stylus 1104 (or finger or other contacting member) on the touch-sensitive portion 1115 of the display 1100 proximate to a first data item 1112 (e.g. Contact2_Message1) of the list of data items 1110. Alternately, if the display 1110 is configured to detect near-surface gestures (e.g. hovering, air gestures, etc.), the receiving the first indication of the selection of the first data item (at 1006) may include detecting a position or movement the stylus 1104 (or finger or other contacting member) proximate to the first data item 1112 that indicates a selection of the first data item 1112.

With continued reference to FIG. 10, in at least some implementations, the process 1000 for gesture-controlled piling of displayed data items further includes receiving an indication of a selection of one or more other data items to be piled with the first data item at 1008. For example, in the illustrative embodiment shown in FIG. 12, receiving the indication of the selection of one or more other data items at 1008 may include detecting a contact of the stylus 1104 (or finger or other contacting member) on the touch-sensitive portion 1115 of the display 1100 (or positioned or moving near the display 1100) proximate to a second data item 1114 (e.g. Contact3_Message1) of the list of data items 1110. In at least some implementations, the process 1000 for gesture-controlled piling of data items may automatically determine that the selection of the second data item 1114 by the user indicates that the second data item 1114 and all intervening data items between the second data item 1114 and the first data item 1112 are intended to be piled with the first data item 1112.

Alternately, in at least some implementations, after selecting the first data item 1112, the user may simply drag the stylus 1104 across the touch-sensitive portion 1115 of the display 1105 to indicate the selection of the one or more other data items for piling. For example, as shown in FIG.

13, in at least some implementations, after receiving the indication of the first data item 1112 (at 1006), the receiving the indication of the selection of one or more other data items (at 1008) may include detecting the stylus 1104 being dragged across (or moved over) the touch-sensitive portion 1115 of the display 1105 (as indicated by arrow 1216) proximate three other data items 1214 (i.e., Contact2_Message2, Contact2_Message3, and Contact3_Message1) that are designated to be piled with the first data item 1112.

Referring again to FIG. 10, the process 1000 for gesture-controlled piling of data items further includes altering the displaying of the list of data items such that the one or more other data items are piled with the first data item at 1010. For example, in the illustrative embodiment shown in FIG. 14, after the user has used the stylus 1104 (or finger or other contacting member) to indicate the selection of one or more other data items (at 1008), the display 1100 (or the system that includes the display 1100) alters the displaying of the list of data items 1110 into a second display state 1405 so that the one or more other data items 1214 are no longer displayed, and a piling symbol 1418 is displayed about the first data item 1112 to indicate that the one or more other data items 1214 are piled together with the first data item 1112.

Referring again to FIG. 10, the process 1000 for gesture-controlled piling of displayed data items further includes determining whether the piling operations are complete at 1012. If piling operations are not complete (e.g. the user indicates that additional piling operations are desired, such as by selecting more data items to be piled with the first data item 1112), then the process 1000 returns to operation 1008, and operations 1008 through 1012 are repeated indefinitely until piling operations are determined to be complete (at 1012). For example, in at least some implementations, the process 1000 may determine that piling operations are complete (at 1012) if the display 1100 (or a system that includes the display 1100) does not detect any additional engagements of the stylus 1104 (or finger or other contacting member) with the display 1100 indicative of piling operations within a predetermined period of time (e.g. 2 seconds). Alternately, in at least some implementations, the process 1000 may determine that piling operations are complete (at 1012) if the display 1100 (or a system that includes the display 1100) detects an engagement of the stylus 1104 (or finger or other contacting member) with the touch-sensitive portion of the display 1100 proximate the piling icon 1102 to, in effect, "turn off" the piling operations. Of course, in alternate implementations, the process 1000 may determine that piling operations are complete (at 1012) in any other suitable manner.

As noted above, it will be appreciated that although the sweeping operations described above and shown in FIGS. 11-14 are used to pile data items from below the first data item 1112 into a pile with the first data item 1112, it will be appreciated that in alternate implementations, data items may be moved into the pile 1418 from above or below the selected first data item 1112.

Once piling operations are determined to be complete (at 1012), the process 1000 includes storing an altered display state of the list of data items for subsequent retrieval and display at 1014. For example, the process 1000 may store the second display state 1405 shown in FIG. 14 once the piling operations 1006 through 1012 have been completed so that the second display state 1405 is available for future retrieval by the user on subsequent attempts to display the list of data items 1110.

The process 1000 for gesture-controlled piling of data items further includes determining whether the user wishes to create another pile at 1016. For example, in the implementation shown in FIG. 14, the display 1100 (or a system that includes the display 1100) determines that no additional piled are to be created (at 1016) unless or until it detects another engagement of the stylus 1104 (or finger or other contacting member) with the touch-sensitive portion 1115 of the display 1110 proximate the piling icon 1102. If it is determined that the user desires to create another pile of data items (at 1016), then the process 1000 returns to operation 1006, and operations 1006 through 1014 are repeated until one or more additional piles of data items are created. Alternately, once it is determined that no additional piles of data items are to be created (at 1016), then the process 1000 ends or continues to other operations at 1018.

Thus, the above-disclosed advantages of the techniques and technologies for gesture-controlled piling of displayed data items may be realized with processes that only require a user to use a single stylus (or finger, or other contacting member). As noted above, by piling the displayed data items and then storing the altered display state, the displayed data items require less display area, and a user is enabled to reach desired portions of data more quickly and efficiently. Techniques and technologies in accordance with the present disclosure may substantially reduce processing requirements associated with numerous unnecessary displaying and scrolling operations, thereby greatly reducing processing requirements, and also reducing energy consumption, of the displaying system. These advantages may further translate into less wear and tear on processors, display components, circuitry, battery, and other components of displaying systems, thereby prolonging useful life and operability of such systems.

Figure 15:
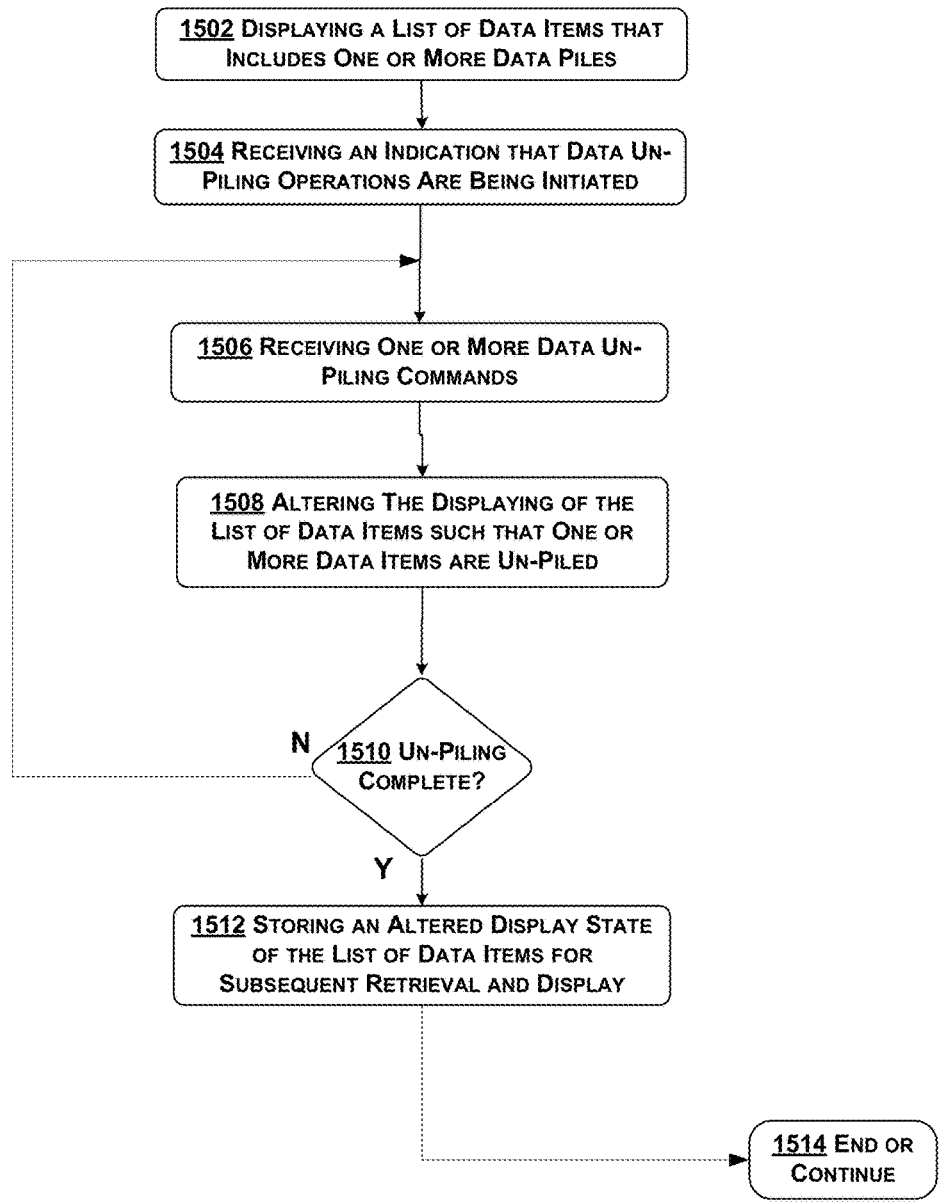
FIG. 15 shows an embodiment of a process for gesture-controlled un-piling of displayed data items.

FIG. 15 shows an embodiment of a process 1500 for gesture-controlled un-piling of displayed data items. In at least some implementations, the process 1500 may be suitable for performing gesture-controlled un-piling of displayed data items after one or more piling operations have been performed (e.g. using process 200, process 1000, etc.). More specifically, as shown in FIG. 15, the process 1500 includes displaying a list of data items that includes one or more data piles at 1502. For example, in one illustrative embodiment, FIG. 16 shows a display 1600 that displays a list of songs 1610 in a first display state 1605. In this embodiment, each song is indicated by an album number and a song number, and each album includes three songs. The first display state 1605 includes a data pile 1618 that includes a portion of the list of songs 1610, specifically Album25_Song1.mp3 through Album38_Song2.mp3.

Referring again to FIG. 15, the process 1500 for gesture-controlled un-piling of data items includes receiving an indication that data un-piling operations are being initiated at 1504. For example, as shown in FIG. 16, in at least some implementations, the display 1600 (or a system that includes the display 1600) may receive an indication that data un-piling operations are being initiated (at 1504) by detecting that a user has engaged two fingers (e.g. a forefinger 1620 and a thumb 1622) with a touch-sensitive portion 1615 of the display 1600 proximate the data pile 1618. In at least some implementations, the engagement of the forefinger 1620 and the thumb 1622 proximate the data pile 1618 may need to meet certain requirements (e.g. proximity range, duration, etc.) to serve as the indication that data un-piling operations are being initiated (at 1504). In alternate implementations, the indication that data un-piling operations are being initiated (at 1504) may be provided in a variety of ways, such as by the user selecting an icon on the display 1600, or by the user performing one or more gestures on or proximate to the touch-sensitive portion 1615 of the display 1600, or providing a voice command (e.g. "un-pile," "un-gaddi", etc.), or any other suitable manner of indication.

As further shown in FIG. 15, the process 1500 for gesture-controlled un-piling of data items includes receiving one or more data un-piling commands at 1506. For example, as shown in FIG. 17, in at least some implementations, the receiving one or more data un-piling commands (at 1506) may include detecting a movement (indicated by arrow 1624) of the user's forefinger 1620 as it is moved across the touch-sensitive portion 1615 of the display 1600 in a direction away from the pile 1618 (e.g. upward direction). In at least some implementations, the user's thumb 1622 remains engaged in contact with the touch-sensitive portion 1615 of the display 1600 proximate the pile 1618 during the movement of the user's forefinger 1620. In the illustrative implementation shown in FIG. 17, the forefinger 1620 has been moved upwardly away from the pile 1618 by three lines of the list of songs 1610, thereby providing one or more commands to un-pile three songs from the pile 1618, namely Album25_Song1.mp3, Album25_Song2.mp3, and Album25_Song3.mp3.

In at least some implementations, the user may continue to provide one or more additional un-piling commands by maintaining the thumb 1622 into engagement with the touch-sensitive portion 1615 of the display 1600 proximate the pile 1618, and by repeating the sweeping movement of the forefinger 1620 upwardly away from the pile 1618 (indicated by arrow 1618) to un-pile as many songs from the pile 1618 as desired.

The process 1500 for gesture-controlled un-piling of data items further includes altering the displaying of the list of data items such that one or more data items are un-piled at 1508. For example, as shown in FIG. 17, the altering the displaying of the list of data items such that one or more data items are un-piled (at 1508) may include causing the display 1600 to display the list of data items 1610 in a second display state 1705 such that the three un-piled songs, namely Album25_Song1.mp3, Album25_Song2.mp3, and Album25_Song3.mp3, have been un-piled from the pile 1618 and now appear in the list of songs 1610 above the pile 1618, and the display 1600 now shows "Album26_Song1.mp3" as the song located at the top of the pile 1618.

It will be appreciated that, as noted above, the altering the displaying of the list of data items such that one or more data items are un-piled (at 1508) may occur consecutively or simultaneously with the receiving one or more data un-piling commands at 1506. For example, in at least some implementations, the display 1600 may not change from the first display state 1605 (FIG. 16) to the second display state 1705 (FIG. 17) until the user's forefinger 1620 has stopped moving upwardly away from the pile 1618. Alternately, in at least some implementations, the altering (at 1508) may occur simultaneously with the receiving of un-piling commands (at 1506) such that each additional un-piled data item becomes visible as the forefinger 1620 moves further and further away from the pile 1618 so that there may exist a series of intermediate display states (not shown) between the first display state 1605 (FIG. 16) and the second display state 1705 (FIG. 17) as each successive data item is un-piled from the pile 1618.

Referring again to FIG. 15, the process 1500 for gesture-controlled un-piling of data items further includes determining whether un-piling operations are complete at 1510. If data un-piling operations are not complete (at 1510), the process 1500 returns to receiving one or more data un-piling commands at 1506, and operations 1506 through 1510 are repeated until un-piling operations are determined to be complete (at 1510).

Figure 19:
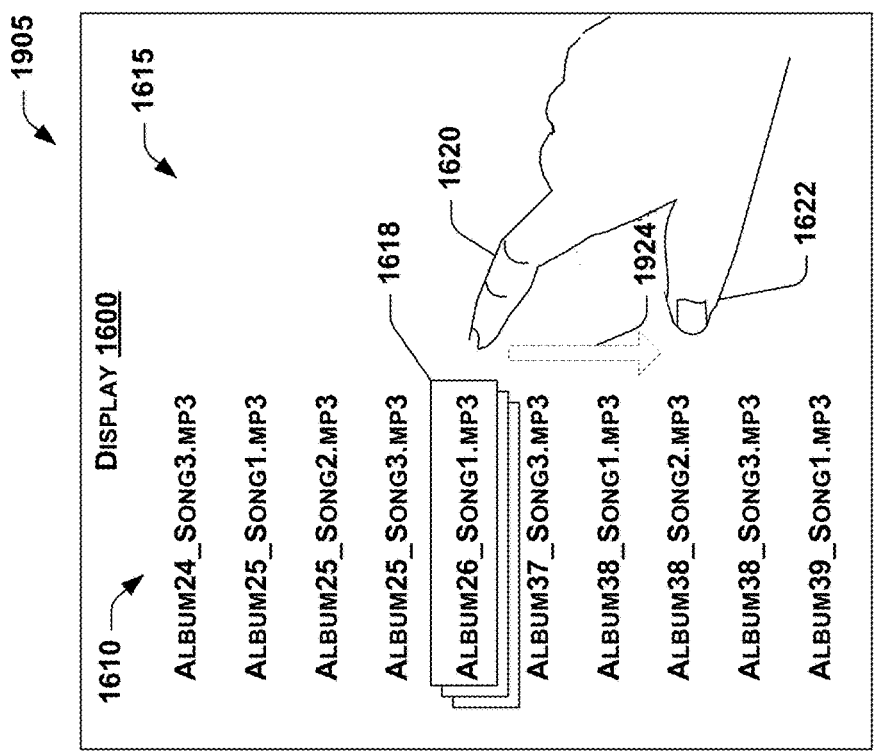

For example, in the illustrative embodiment shown in FIG. 18, the process 1500 may detect that the user has once again placed the forefinger 1620 and thumb 1622 into engagement with the touch-sensitive portion 1615 of the display 1600 proximate the pile 1618, thereby indicating that the un-piling operations are not complete (at 1510) and that the user wishes to perform additional un-piling of the pile 1618. The process 1500 then returns to receiving one or more data un-piling commands at 1506. As shown in FIG. 19, in at least some implementations, the receiving one or more data un-piling commands (at 1506) may include detecting that the user has moved the thumb 1622 downwardly away from the pile 1618 (as indicated by arrow 1924) with the forefinger 1620 remaining engaged with the touch-sensitive portion 1615 of the display 1600 proximate the pile 1618. In the illustrative embodiment shown in FIG. 19, the thumb 1622 has moved downwardly enough to un-pile three songs from the pile 1618, namely Album37_Song3.mp3, Album38_Song1.mp3, and Album38_Song2.mp3. The process 1500 further includes altering the displaying of the list of data items (at 1508) by displaying a third display state 1905 having the three un-piled songs (Album37_Song3.mp3, Album38_Song1.mp3, and Album38_Song2.mp3) now being displayed below the pile 1618.

Referring again to FIG. 15, after it is determined that un-piling operations are complete (at 1510), the process 1500 for gesture-controlled un-piling of data items further includes storing an altered display state of the list of data items for subsequent retrieval and display at 1512. More specifically, the storing an altered display state (at 1512) may include storing the third display state 1905 of the list of songs 1610 for subsequent retrieval and display. As noted above, in other implementations, the storing of the altered display state may occur elsewhere during the process 1500 (e.g. after the altering of the displaying of the list of data items at 1508). Finally, the process 1500 ends or continues to other operations at 1514.

It should be appreciated that techniques and technologies for gesture-controlled piling (and un-piling) of data items as described above are not limited to implementations involving one-dimensional lists of data items, but rather, in alternate implementations, such techniques and technologies may also be applied to two-dimensional arrays of data items. Thus, in the above-described implementations, the same piling and un-piling operations may be performed on rows of data items to create piles of rows of data items, and also on columns of data items to create piles of columns of data items.

Figure 20:
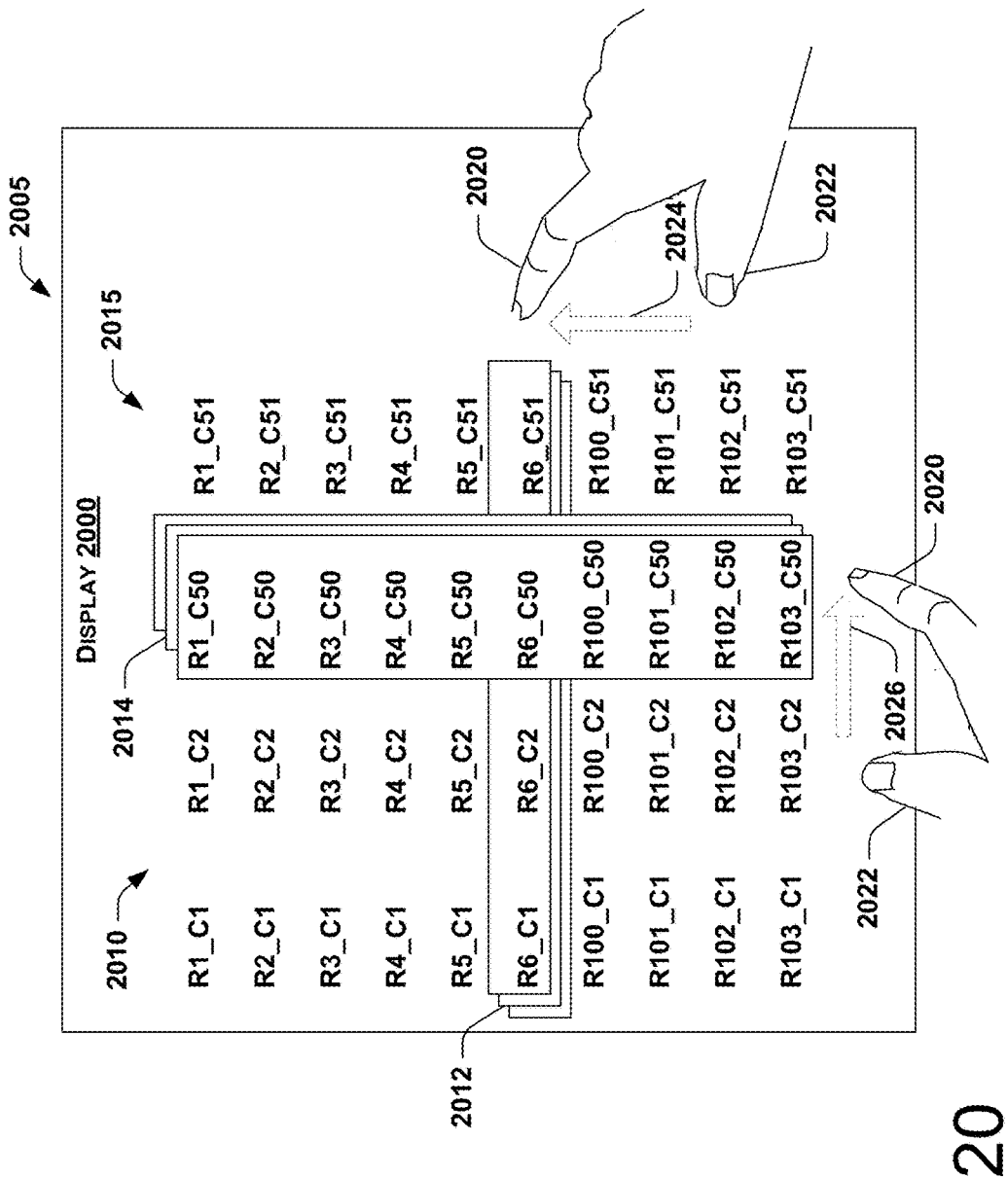
FIG. 20 shows an embodiment of a display displaying a two-dimensional array of data items.

For example, FIG. 20 shows an embodiment of a display 2000 displaying a two-dimensional array of data items 2010 in an altered display state 2005. In the illustrative embodiment shown in FIG. 20, the data items are designated by their respective row and column number corresponding to an original, unaltered array of data items. Thus, the first displayed data item is designated as "R1_C1" which indicates the data item in the first row and first column.

In the altered display state 2005 shown in FIG. 20, the array of data items 2010 includes a pile of data rows 2012 and a pile of data columns 2014. It will be appreciated that the pile of data rows 2012 and the pile of data columns 2014 may have been generated using one or more of the processes described above (e.g. process 200, process 1000, process 1500, etc.). For example, in at least some implementations, the pile of data rows 2012 may have been generated by a user applying a forefinger 2020 to a touch-sensitive portion 2015 of the display 2000 proximate the sixth row of data items, and then performing one or more upward movements or sweeping operations with a thumb 2022 (indicated by arrow 2024) to sweep rows 7 through 99 into the pile of data rows 2012. Similarly, the pile of data columns 2014 may have been generated by applying the forefinger 2020 to the touch-sensitive portion 2015 of the display 2000 proximate the fiftieth column, and then performing one or more lateral movements or sweeping operations with the thumb 2022 (indicated by arrow 2026) to move columns three through forty nine into the pile of data columns 2014. In this way, by creating the pile of data rows 2012 and the pile of data columns 2014, and by storing the altered data state 2005 for subsequent retrieval and display, the user may have immediate visibility of the data item located in the one hundred third row and the fifty first column (i.e. "R103_C51") during subsequent displaying operations without the need for performing repetitive, time-consuming, and resource-intensive scrolling operations.

In general, techniques and technologies disclosed herein for gesture-controlled piling and un-piling of data items may be described in the general context of computer code or machine-useable instructions, including computer-executable instructions such as program modules, being executed by a computer or other device. Generally, program modules including routines, programs, objects, components, data structures, etc., refer to code that perform particular tasks or implement particular abstract data types. Various embodiments of the invention may be practiced in a variety of system configurations, including hand-held devices, consumer electronics, general-purpose computers, more specialty computing devices, etc. In addition, various embodiments of the invention may also be practiced in distributed computing environments (e.g. cloud-based computing systems) where tasks are performed by remote-processing devices that are linked through a communications network.

Figure 21:
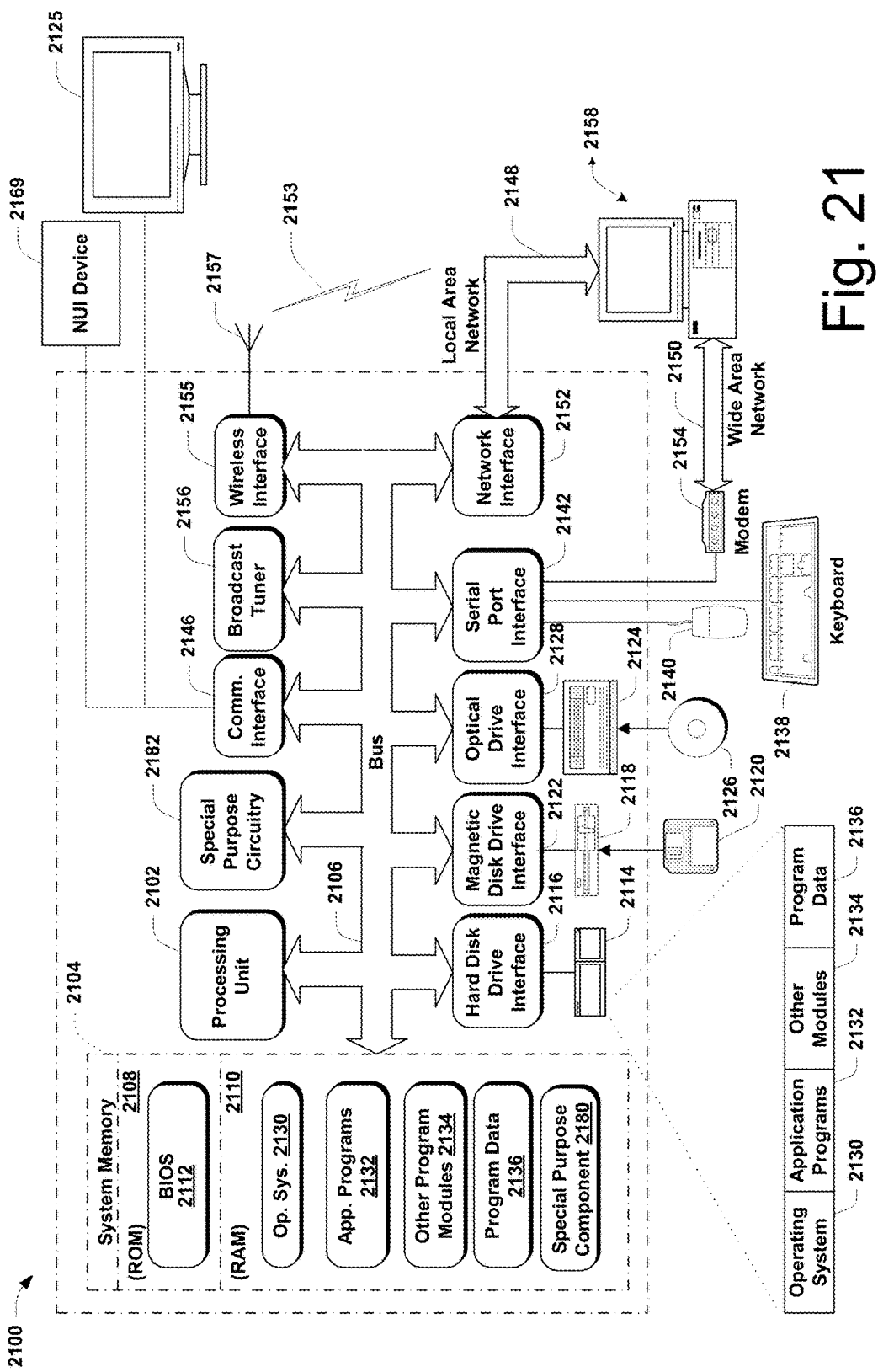
FIG. 21 shows an embodiment of a computer system environment for gesture-controlled piling and un-piling of displayed data.

Furthermore, techniques and technologies disclosed herein for gesture-controlled piling and un-piling of data items may be implemented on a wide variety of devices and platforms. For example, FIG. 21 shows an embodiment of a computer system 2100 that may be employed for downloading visual assets for applications. As shown in FIG. 21, the example computer system environment 2100 includes one or more processors (or processing units) 2102, special purpose circuitry 2182, memory 2104, and a bus 2106 that operatively couples various system components, including the memory 2104, to the one or more processors 2102 and special purpose circuitry 2182 (e.g., Application Specific Integrated Circuitry (ASIC), Field Programmable Gate Array (FPGA), etc.).

The bus 2106 may represent one or more of any of several types of bus structures, including a memory bus or memory controller, a peripheral bus, an accelerated graphics port, and a processor or local bus using any of a variety of bus architectures. In at least some implementations, the memory 2104 includes read only memory (ROM) 2108 and random access memory (RAM) 2110. A basic input/output system (BIOS) 2112, containing the basic routines that help to transfer information between elements within the system 2100, such as during start-up, is stored in ROM 2108.

The example system environment 2100 further includes a hard disk drive 2114 for reading from and writing to a hard disk (not shown), and is connected to the bus 2106 via a hard disk driver interface 2116 (e.g., a SCSI, ATA, or other type of interface). A magnetic disk drive 2118 for reading from and writing to a removable magnetic disk 2120, is connected to the system bus 2106 via a magnetic disk drive interface 2122. Similarly, an optical disk drive 2124 for reading from or writing to a removable optical disk 2126 such as a CD ROM, DVD, or other optical media, connected to the bus 2106 via an optical drive interface 2128. The drives and their associated computer-readable media may provide nonvolatile storage of computer readable instructions, data structures, program modules and other data for the system environment 2100. Although the system environment 2100 described herein employs a hard disk, a removable magnetic disk 2120 and a removable optical disk 2126, it should be appreciated by those skilled in the art that other types of computer readable media which can store data that is accessible by a computer, such as magnetic cassettes, flash memory cards, digital video disks, random access memories (RAMs) read only memories (ROM), and the like, may also be used.

The computer-readable media included in the system memory 2100 can be any available or suitable media, including volatile and nonvolatile media, and removable and non-removable media, and may be implemented in any method or technology suitable for storage of information such as computer-readable instructions, data structures, program modules, or other data. More specifically, suitable computer-readable media may include random access memory (RANI), read only memory (ROM), electrically erasable programmable ROM (EEPROM), flash memory or other memory technology, compact disk ROM (CD-ROM), digital versatile disks (DVD) or other optical disk storage, magnetic cassettes, magnetic tape, magnetic disk storage or other magnetic storage devices, or any other medium, including paper, punch cards and the like, which can be used to store the desired information. As used herein, the term "computer-readable media" is not intended to include transitory signals.

As further shown in FIG. 21, a number of program modules may be stored on the memory 2104 (e.g., the ROM 2108 or the RAM 2110) including an operating system 2130, one or more application programs 2132, other program modules 2134, and program data 2136 (e.g., the data store 2120, image data, audio data, three dimensional object models, etc.). Alternately, these program modules may be stored on other computer-readable media, including the hard disk, the magnetic disk 2120, or the optical disk 2126. For purposes of illustration, programs and other executable program components, such as the operating system 2130, are illustrated in FIG. 21 as discrete blocks, although it is recognized that such programs and components reside at various times in different storage components of the system environment 2100, and may be executed by the processor(s) 2102 or the special purpose circuitry 2182 of the system environment 2100.

A user may enter commands and information into the system environment 2100 through input devices such as a keyboard 2138 and a pointing device 2140. Other input devices (not shown) may include a microphone, joystick, game pad, satellite dish, scanner, or the like. Still other input devices, such as a Natural User Interface (NUI) device 2169, or user interface 2125, include or involve one or more aspects of a Natural User Interface (NUI) that enables a user to interact with the system environment 2100 in a "natural" manner, free from artificial constraints imposed by conventional input devices such as mice, keyboards, remote controls, and the like. For example, in at least some embodiments, the NUI device 2169 may rely on speech recognition, touch and stylus recognition, one or more biometric inputs, gesture recognition both on screen and adjacent to the screen, air gestures, head and eye (or gaze) tracking, voice and speech, vision, touch, hover, gestures, machine intelligence, as well as technologies for sensing brain activity using electric field sensing electrodes (EEG and related methods) to receive inputs. In addition, in at least some embodiments, an NUI may involve or incorporate one or more aspects of touch sensitive displays, voice and speech recognition, intention and goal understanding, motion gesture detection using depth cameras (such as stereoscopic or time-of-flight camera systems, infrared camera systems, RGB camera systems and combinations of these), motion gesture detection using accelerometers/gyroscopes, facial recognition, 3D displays, head, eye, and gaze tracking, immersive augmented reality and virtual reality systems, all of which provide a more natural interface.

More specifically, in at least some embodiments, the NUI device 2169 may be configured to detect one or more contacts, or one or more non-contacting gestures that are indicative of one or more selections by a user in accordance with any of the embodiments of techniques and technologies for gesture-controlled piling of data items as described above with respect to FIGS. 1-20. For example, in at least some implementations, the NUI device 2169 may include a non-contact gesture detection device operable to detect gestures such as a Kinect® system commercially-available from the Microsoft Corporation, a Wii® system commercially-available from Nintendo of America, Inc., a HoloLens™ system commercially-available from the Microsoft Corporation, or any of a variety of eye or gaze tracking devices, including, for example, the devices, systems, and technologies of Tobii Technology, Inc. (e.g. Pro Glasses 2, StarVR, Tobii EyeChip, Model 1750 Eye Tracker, etc.), or those of Xlabs Pty Ltd., or any other suitable devices, systems, and technologies. In this way, the NUI device 2169 may be configured to detect at least one of contacts or non-contacting gestures by a user that are indicative of selections for performing operations as described above with respect to FIGS. 1-20 for implementing techniques and technologies for gesture-controlled piling of data items as disclosed herein, including, for example, the gesture-controlled piling of data items displayed on the user interface 2125, a remote computer 2158 (FIG. 21), or any other suitable device (e.g. HoloLens, Pro Glasses 2, StarVR, etc.).

These and other input devices are connected to the processing unit 2102 and special purpose circuitry 2182 through an interface 2142 or a communication interface 2146 (e.g. video adapter) that is coupled to the system bus 2106. A user interface 2125 (e.g., display, monitor, or any other user interface device) may be connected to the bus 2106 via an interface, such as a video adapter 2146. In addition, the system environment 2100 may also include other peripheral output devices (not shown) such as speakers and printers.

The system environment 2100 may operate in a networked environment using logical connections to one or more remote computers (or servers) 2158. Such remote computers (or servers) 2158 may be a personal computer, a server, a router, a network PC, a peer device or other common network node. The logical connections depicted in FIG. 21 include one or more of a local area network (LAN) 2148 and a wide area network (WAN) 2150. Such networking environments are commonplace in offices, enterprise-wide computer networks, intranets, and the Internet. In this embodiment, the system environment 2100 also includes one or more broadcast tuners 2156. The broadcast tuner 2156 may receive broadcast signals directly (e.g., analog or digital cable transmissions fed directly into the tuner 2156) or via a reception device (e.g., via an antenna 2157, a satellite dish, etc.).

When used in a LAN networking environment, the system environment 2100 may be connected to the local area network 2148 through a network interface (or adapter) 2152. When used in a WAN networking environment, the system environment 2100 typically includes a modem 2154 or other means (e.g., router) for establishing communications over the wide area network 2150, such as the Internet. The modem 2154, which may be internal or external, may be connected to the bus 2106 via the serial port interface 2142. Similarly, the system environment 2100 may exchange (send or receive) wireless signals 2153 with one or more remote devices using a wireless interface 2155 coupled to a wireless communicator 2157 (e.g., an antenna, a satellite dish, a transmitter, a receiver, a transceiver, a photoreceptor, a photodiode, an emitter, a receptor, etc.).

In a networked environment, program modules depicted relative to the system environment 2100, or portions thereof, may be stored in the memory 2104, or in a remote memory storage device. More specifically, as further shown in FIG. 21, a special purpose component 2180 may be stored in the memory 2104 of the system environment 2100. The special purpose component 2180 may be implemented using software, hardware, firmware, or any suitable combination thereof. In cooperation with the other components of the system environment 2100, such as the processing unit 2102 or the special purpose circuitry 2182, the special purpose component 2180 may be operable to perform one or more implementations of techniques described above (e.g., example process 200 of FIG. 2, process 1000 of FIG. 10, process 1500 of FIG. 15, etc.).

Generally, application programs and program modules executed on the system environment 2100 may include routines, programs, objects, components, data structures, etc., for performing particular tasks or implementing particular abstract data types. These program modules and the like may be executed as a native code or may be downloaded and executed, such as in a virtual machine or other just-in-time compilation execution environments. Typically, the functionality of the program modules may be combined or distributed as desired in various implementations.

In view of the disclosure of techniques and technologies for gesture-controlled piling of displayed data items as disclosed herein, a few representative embodiments are summarized below. It should be appreciated that the following summary of representative embodiments is not intended to be exhaustive of all possible embodiments, and that additional embodiments may be readily conceived from the disclosure of techniques and technologies provided herein.

For example, in at least some embodiments, a system gesture-controlled piling of displayed data includes a memory configured to store a plurality of data items; a display including a touch sensitive portion configured to display the plurality of data items; a processing component operatively coupled to the memory and to the display, the processing component configured to: control the display to display the plurality of data items; receive at least one first selection signal from the touch-sensitive portion of the display indicating a selection of a first data item of the plurality of displayed data items; receive at least one second selection signal from the touch-sensitive portion of the display indicating a selection of one or more second data items of the plurality of displayed data items; and control the display to alter the display of the plurality of data items such that the one or more second data items are no longer displayed and to alter the display of the first data item to visually indicate that the one or more second data items are piled into a pile with the first data item.

In at least some implementations, the processing component configured to control the display to display the plurality of data items comprises a processing component configured to control the display to display the plurality of data items as at least one of a list of data items or a two dimensional array of data items. In further implementations, the processing component is further configured store the altered display of the plurality of data items on the memory for subsequent retrieval and display. In still other implementations, the processing component configured to receive at least one first selection signal from the touch-sensitive portion of the display indicating a selection of a first data item of the plurality of displayed data items comprises a processing component configured to detect a contact with the touch-sensitive portion of the display proximate the first data item of the plurality of displayed data items.

In addition, in at least some implementations, the processing component configured to receive at least one second selection signal from the touch-sensitive portion of the display indicating a selection of one or more second data items of the plurality of displayed data items comprises a processing component configured to detect a moving contact with the touch-sensitive portion of the display proximate the one or more second data items of the plurality of displayed data items. And in still other implementations, the processing component configured to receive at least one second selection signal from the touch-sensitive portion of the display indicating a selection of one or more second data items of the plurality of displayed data items comprises a processing component configured to detect an upwardly or downwardly sweeping movement toward the first data item across the touch-sensitive portion of the display proximate the one or more second data items of the plurality of displayed data items.

In at least some implementations, the processing component configured to receive at least one second selection signal from the touch-sensitive portion of the display indicating a selection of one or more second data items of the plurality of displayed data items comprises a processing component configured to detect a laterally sweeping movement toward the first data item across the touch-sensitive portion of the display proximate the one or more second data items of the plurality of displayed data items. And in other implementations, the processing component is further configured to receive the at least one first selection signal simultaneously with the at least one second selection signal.

In at least some further implementations, the processing component is further configured to control the display to alter the display of the plurality of data items to visually indicate that the one or more second data items are piled into a pile with the first data item simultaneously with receiving the at least one second selection signal. And in some additional implementations, the processing component is further configured to control the display to alter the display of the plurality of data items to visually indicate that the one or more second data items are piled into a pile with the first data item simultaneously with receiving the at least one second selection signal.

In still other implementations, the processing component configured to control the display to display the plurality of data items comprises a processing component configured to control the display to display the plurality of data items as a two dimensional array of data items including a plurality of data rows and a plurality of data columns, and wherein the processing component configured to control the display to alter the display comprises a processing component configured control the display to alter the display of the plurality of data items such that at least one data row of the plurality of data rows is no longer displayed and to alter the display of at least one data row to visually indicate that at least one first data row is piled into a pile with at least one second data row.

In addition, in at least some implementations, the processing component is further configured to receive at least one third selection signal from the touch-sensitive portion of the display indicating a selection of one or more third data items to be un-piled from the pile; and control the display to alter the display of the plurality of data items such that the one or more third data items are displayed.

Similarly, in at least some implementations, a system for gesture-controlled piling of displayed data, comprises a display operable to detect at least one of a gesture proximate at least a gesture-sensitive portion of the display or a touch of a touch-sensitive portion of the display, the display configured to display a plurality of data items; a processing component operatively coupled to the display, the processing component configured to: control the display to display a plurality of data items; detect using at least one of the gesture-sensitive portion or the touch-sensitive portion a selection of a first data item of the plurality of displayed data items; detect using at least one of the gesture-sensitive portion or the touch-sensitive portion a selection of one or more second data items of the plurality of displayed data items; and control the display to alter the display of the plurality of data items such that the one or more second data items visually appear to be moved into a pile with the first data item.

In at least some implementations, the processing component is further configured to store the altered display of the plurality of data items on a memory for subsequent retrieval and display. In further implementations, the processing component is further configured to detect the selection of one or more second data items of the plurality of displayed data items while the processing component continues to detect the selection of the first data item. In still further implementations, the processing component is further configured to detect the selection of the first data item simultaneously with the detection of the selection of the one or more second data items.

Additionally, in at least some implementations, a method for gesture-controlled piling of displayed data comprises: displaying a plurality of data items using a display; detecting at least one of a first gesture or a first contact indicative of a selection of a first data item of the plurality of displayed data items; detecting at least one of a second gesture or a second contact indicative of a selection of one or more second data items of the plurality of displayed data items; and altering the display of the plurality of data items on the display such that the one or more second data items visually appear to be moved into a pile with the first data item.

In at least some implementations, a method further comprises storing the altered display of the plurality of data items on a memory for subsequent retrieval and display. And in still other implementations, detecting with a selection of one or more second data items of the plurality of displayed data items occurs while continuing to detect the selection of the first data item.

CONCLUSION

Those skilled in the art will recognize that some aspects of the embodiments disclosed herein can be implemented in standard integrated circuits, and also as one or more computer programs running on one or more computers, and also as one or more software programs running on one or more processors, and also as firmware, as well as virtually any combination thereof. It will be further understood that designing the circuitry and/or writing the code for the software and/or firmware could be accomplished by a person skilled in the art in light of the teachings and explanations of this disclosure.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. It will be appreciated that the embodiments of techniques and technologies described above are not exhaustive of all possible embodiments considered to be within the scope of the present disclosure, and that additional embodiments may be conceived based on the subject matter disclosed herein. For example, in alternate embodiments one or more elements or components of the techniques and technologies described above may be re-arranged, re-ordered, modified, or even omitted to provide additional embodiments that are still considered to be within the scope of the present disclosure.

Alternately, or in addition, the techniques and technologies described herein can be performed, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-On-a-Chip systems (SOCs), Complex Programmable Logic Devices (CPLDs), etc. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Although the subject matter has been described in language specific to structural features and/or acts, it is to be understood that the subject matter defined in the appended claims is not necessarily limited to the specific features or acts described. Rather, the specific features and acts described above are disclosed as examples of implementing the claims and other equivalent features and acts are intended to be within the scope of the claims. The various embodiments and implementations described above are provided by way of illustration only and should not be construed as limiting various modifications and changes that may be made to the embodiments and implementations described above without departing from the spirit and scope of the disclosure.

What is claimed is:

1. A system for gesture-controlled piling of displayed data, comprising:
a memory configured to store a plurality of data items;
a display including a touch sensitive portion configured to display the plurality of data items;
a processing component operatively coupled to the memory and to the display, the processing component configured to:
control the display to display the plurality of data items;
receive at least one first selection signal from the touch-sensitive portion of the display indicating a first physical contact with the touch-sensitive portion of the display indicating a selection of a first data item of the plurality of displayed data items;
receive at least one second selection signal from the touch-sensitive portion of the display indicating a second physical contact with the touch-sensitive portion of the display indicating a selection of one or more second data items of the plurality of displayed data items, the one or more second data items to be displayed as being piled into a pile with the first data item; and
control the display to alter the display of the plurality of data items such that the one or more second data items are no longer displayed and to alter the display of the first data item to visually indicate that the one or more second data items are piled into the pile with the first data item by visually depicting each of the one or more second data items successively disappearing into the pile with the first data item as the second physical contact is moved toward the first physical contact.

2. The system of claim 1, wherein the processing component configured to control the display to display the plurality of data items comprises:
a processing component configured to control the display to display the plurality of data items as at least one of a list of data items or a two dimensional array of data items.

3. The system of claim 1, wherein the processing component is further configured store the altered display of the plurality of data items on the memory for subsequent retrieval and display.

4. The system of claim 1, wherein the processing component configured to receive at least one second selection signal from the touch-sensitive portion of the display indicating a second physical contact with the touch-sensitive portion of the display indicating a selection of one or more second data items of the plurality of displayed data items comprises:
a processing component configured to receive at least one second selection signal from the touch-sensitive portion of the display indicating a second physical contact with the touch-sensitive portion of the display indicating a selection of one or more second data items while continuing to receive the at least one first selection signal from the touch-sensitive portion of the display indicating a first physical contact with the touch sensitive portion of the display.

5. The system of claim 1, wherein the processing component configured to receive at least one second selection signal from the touch-sensitive portion of the display indicating a second physical contact with the touch-sensitive portion of the display indicating a selection of one or more second data items of the plurality of displayed data items comprises:
a processing component configured to detect a moving physical contact with the touch-sensitive portion of the display proximate the one or more second data items of the plurality of displayed data items indicating a selection of one or more second data items.

6. The system of claim 1, wherein the processing component configured to receive at least one second selection signal from the touch-sensitive portion of the display indicating a second physical contact with the touch-sensitive portion of the display indicating a selection of one or more second data items of the plurality of displayed data items comprises:
a processing component configured to detect an upwardly or downwardly sweeping physical contact toward the first data item across the touch-sensitive portion of the display proximate the one or more second data items of the plurality of displayed data items indicating a selection of one or more second data items.

7. The system of claim 1, wherein the processing component configured to receive at least one second selection signal from the touch-sensitive portion of the display indicating a second physical contact with the touch-sensitive portion of the display indicating a selection of one or more second data items of the plurality of displayed data items comprises:
a processing component configured to detect a laterally sweeping physical contact toward the first data item across the touch-sensitive portion of the display proximate the one or more second data items of the plurality of displayed data items indicating a selection of one or more second data items.

8. The system of claim 1, wherein the processing component is further configured to receive the at least one first selection signal simultaneously with the at least one second selection signal.

9. The system of claim 1, wherein the processing component is further configured to control the display to alter the display of the plurality of data items to visually indicate that the one or more second data items are piled into a pile with the first data item simultaneously with receiving the at least one second selection signal.

10. The system of claim 1, wherein the processing component configured to control the display to alter the display of the plurality of data items to visually indicate that the one or more second data items are piled into the pile with the first data item comprises:
a processing component configured to control the display to alter the display of the plurality of data items to visually indicate that the one or more second data items are piled into the pile with the first data item by visually depicting each of the one or more second data items successively disappearing into the pile with the first data item as the second physical contact is moved toward the first physical contact, the plurality of data items being piled in an ordered manner with the second data item at a bottom of the pile and the first data item visible at a top of the pile.

11. The system of claim 1, wherein the processing component configured to control the display to display the plurality of data items comprises:
a processing component configured to control the display to display the plurality of data items as a two dimensional array of data items including a plurality of data rows and a plurality of data columns;
and wherein the processing component configured to control the display to alter the display comprises:
a processing component configured control the display to alter the display of the plurality of data items such that at least one data row of the plurality of data rows is no longer displayed and to alter the display of at least one data row to visually indicate that at least one first data row is piled into a pile with at least one second data row.

12. The system of claim 1, wherein the processing component is further configured to:
receive at least one third selection signal from the touch-sensitive portion of the display indicating a third physical contact with the touch-sensitive portion of the display indicating a selection of one or more third data items to be un-piled from the pile; and
control the display to alter the display of the plurality of data items such that the one or more third data items are un-piled from the pile and displayed.

13. A system for gesture-controlled piling of displayed data, comprising:
a display operable to detect physical contact of a touch-sensitive portion of the display, the display configured to display a plurality of data items;
a processing component operatively coupled to the display, the processing component configured to:
control the display to display a plurality of data items as a two dimensional array of data items including a plurality of data rows and a plurality of data columns;
detect using the touch-sensitive portion a first physical contact indicating a selection of a first data item of the plurality of displayed data items;
detect using the touch-sensitive portion a second physical contact indicating a selection of one or more second data items of the plurality of displayed data items, the one or more second data items to be displayed as being piled into a pile with the first data item; and
control the display to alter the display of the plurality of data items such that the one or more second data items visually appear to be moved into the pile with the first data item, including to alter the display such that at least one data row of the plurality of data rows is no longer displayed and to alter the display of at least one data row to visually indicate that at least one first data row is piled into a pile with at least one second data row.

14. The system of claim 13, wherein the processing component is further configured to store the altered display of the plurality of data items on a memory for subsequent retrieval and display.

15. The system of claim 13, wherein the processing component is further configured to detect the second physical contact indicating the selection of one or more second data items of the plurality of displayed data items while the processing component continues to detect the first physical contact indicating the selection of the first data item.

16. The system of claim 13, wherein the processing component is further configured to detect the first physical contact indicating the selection of the first data item simultaneously with the detection of the second physical contact indicating the selection of the one or more second data items.

17. A method for gesture-controlled piling of displayed data, comprising:
displaying a plurality of data items as a list of data items using a display having a contact-sensitive portion;
detecting a first physical contact with the contact-sensitive portion of the display indicative of a selection of a first data item of the plurality of displayed data items;
detecting a second physical contact with the contact-sensitive portion of the display indicative of a selection of one or more second data items of the plurality of displayed data items, the one or more second data items to be displayed as being piled into a pile with the first data item; and altering the display of the plurality of data items on the display such that the one or more second data items are depicted as successively disappearing into the pile with the first data item until the one or more second data items are no longer displayed, the first data item and one or more remaining data items of the list of data items remaining visible as an altered list of data items.

18. The method of claim 17, further comprising storing the altered display of the plurality of data items on a memory for subsequent retrieval and display.

19. The method of claim 17, wherein detecting the second physical contact with the contact-sensitive portion of the display indicative of a selection of one or more second data items of the plurality of displayed data items occurs while continuing to detect the first physical contact with the contact-sensitive portion of the display indicative of the selection of the first data item.

20. The method of claim 17, wherein altering the display of the plurality of data items on the display such that the one or more second data items are depicted as successively disappearing into the pile with the first data item until the one or more second data items are no longer displayed comprises:

altering the display of the plurality of data items on the display such that the one or more second data items are depicted as successively disappearing into the pile with the first data item until the one or more second data items are no longer displayed, the one or more second data items being piled in an ordered manner with one of the one or more second data items at a bottom of the pile and the first data item visible at a top of the pile.

* * * * *